United States Patent
Keys et al.

(10) Patent No.: US 10,070,654 B2
(45) Date of Patent: Sep. 11, 2018

(54) PLANT-BASED EGG SUBSTITUTE COMPOSITIONS

(71) Applicant: Earth Island, Chatsworth, CA (US)

(72) Inventors: Erin Keys, Santa Monica, CA (US); Robert Goldberg, West Hills, CA (US)

(73) Assignee: Earth Island, Chatsworth, CA (US)

( * ) Notice: Subject to any disclaimer, the term of this patent is extended or adjusted under 35 U.S.C. 154(b) by 0 days.

(21) Appl. No.: 14/956,100

(22) Filed: Dec. 1, 2015

(65) Prior Publication Data

US 2017/0020166 A1  Jan. 26, 2017

Related U.S. Application Data

(60) Provisional application No. 62/195,234, filed on Jul. 21, 2015.

(51) Int. Cl.

| A23L 15/00 | (2016.01) |
|---|---|
| A21D 13/064 | (2017.01) |
| A23L 1/0534 | (2006.01) |
| A23L 1/054 | (2006.01) |
| A23L 1/304 | (2006.01) |
| A23L 1/32 | (2006.01) |
| A23L 1/337 | (2006.01) |
| A21D 10/00 | (2006.01) |
| A23L 29/238 | (2016.01) |
| A23L 29/256 | (2016.01) |
| A23L 29/262 | (2016.01) |
| A23L 29/269 | (2016.01) |
| A23L 27/60 | (2016.01) |

(52) U.S. Cl.
CPC ......... *A21D 13/064* (2013.01); *A21D 10/005* (2013.01); *A23L 1/0534* (2013.01); *A23L 1/0545* (2013.01); *A23L 1/304* (2013.01); *A23L 1/3216* (2013.01); *A23L 1/337* (2013.01); *A23L 15/35* (2016.08); *A23L 27/60* (2016.08); *A23L 29/238* (2016.08); *A23L 29/256* (2016.08); *A23L 29/262* (2016.08); *A23L 29/272* (2016.08); *A23V 2002/00* (2013.01)

(58) Field of Classification Search
CPC ........ A21D 10/00; A23L 15/00; A23L 1/3216
See application file for complete search history.

(56) References Cited

U.S. PATENT DOCUMENTS

| 3,956,173 A | 5/1976 | Towle |
| 4,120,986 A | 10/1978 | Lynn |
| 5,605,712 A | 2/1997 | Bertrand et al. |
| 5,789,004 A | 8/1998 | Hogan et al. |
| 5,976,586 A | 11/1999 | Feller |
| 2005/0244540 A1 | 11/2005 | Kepplinger et al. |
| 2006/0286205 A1 | 12/2006 | Fichtali et al. |
| 2008/0038434 A1 | 2/2008 | Engleson et al. |
| 2010/0303989 A1 | 12/2010 | Brooks et al. |
| 2014/0106053 A1* | 4/2014 | Rudie ............... A23L 29/206 426/557 |
| 2014/0356507 A1* | 12/2014 | Tetrick .............. A21D 2/165 426/550 |
| 2015/0147445 A1* | 5/2015 | Galuska ............. A23L 1/16 426/276 |

FOREIGN PATENT DOCUMENTS

| DE | 202008009905 U1 * | 12/2008 | .............. C02F 1/04 |
| GB | 2 377 155 A | 1/2003 | |
| GB | 2 395 413 A | 5/2004 | |
| WO | WO 2011/109300 A1 | 9/2011 | |
| WO | WO 2013/000137 A1 | 1/2013 | |
| WO | WO 2013/067453 A1 | 5/2013 | |
| WO | WO-2013181077 A2 * | 12/2013 | .............. A23L 1/16 |

OTHER PUBLICATIONS

Crozier-Dodson et al., "Formulating Food Safety: An overview of antimicrobial ingredients". Available online as of Dec. 2004/Jan. 2005 from www.foodsafetymagazine.com. pp. 1-10.*
"HPP Technology". Available online from www.hiperbaric.com as of 2012 (no month). pp. 1-3.*
"Cinnamon Streusel Swirl Coffee Cake". Available online as of Sep. 8, 2008 from www.spiceplace.com. pp. 1-2.*
Machine translation of DE202007009905, published Nov. 6, 2008. pp. 1-4.*
"Emulsion" definition. Available online from Dictionary.com as of Dec. 6, 2016. pp. 1-3.*
Ubwa, et al. "Studies on the gelatinization temperature of some cereal starches". International Journal of Chemistry, vol. 4, No. 6, 2012. pp. 1-7.*
Gibbs, et al., "Encapsulation in the food industry: a review," International Journal of Food Services and Nutrition, 1999; 50; pp. 213-224.
Heinz Asean, "Original Mayonnaise," MiNTEL Nov. 2013; Record ID 2205530; www.gnpd.com.

(Continued)

Primary Examiner — Jenna A Watts
(74) Attorney, Agent, or Firm — Lewis Roca Rothgerber Christie LLP

(57) ABSTRACT

An egg substitute composition includes a substantially egg-less dry mixture that includes a starch and/or lipid source and/or a protein source, and a hydrocolloid system. The hydrocolloid system includes a mixture of hydrocolloids and a crosslinking agent. The crosslinking agent is adapted to crosslink the mixture of hydrocolloids upon the introduction of a liquid. The mixture of hydrocolloids includes a lower-temperature gelling hydrocolloid and a higher-temperature gelling hydrocolloid. The compositions may further include a liquid activator, which may be added to the dry mix to hydrate the composition, and enable use of the composition in any application typically calling for raw eggs, e.g., scrambled eggs, omelets, frittatas, etc. The compositions (in dry or hydrated form) may also be used as egg-substitutes in various different applications, such as in emulsions (e.g., mayonnaise), and baking mixes.

57 Claims, 11 Drawing Sheets

(56) References Cited

OTHER PUBLICATIONS

Symington's, "Marbled Cheesecake Mix," MiNTEL May 2015; Record ID 3149405; www.gnpd.com.
International Search Report for International Application No. PCT/US2016/013941, dated May 20, 2016 (7 pages).
Written Opinion for International Application No. PCT/US2016/013941, dated May 20, 2016 (9 pages).
International Search Report and Written Opinion of the International Searching Authority, dated Sep. 21, 2016, issued in International Application No. PCT/US2016/041645, 16 pages.
Lersch, M., "Texture—A Hydrocolloid Recipe Collection", Version 2.3, May 2010, pp. 1-100; retrieved from Internet on Jan. 3, 2017 at URL: <http://www.chymist.com/hydrocolloid-recipe-collection-v2.3.pdf>.
AU Examination Report No. 1 dated Feb. 14, 2017, in corresponding AU Application No. 2016231495, 8 pages.
Rhodes, Jesse, "Meringue Chemistry: The Secrets of Fluff", Smithsonian.com, Jan. 20, 2012, obtained from https://www.smithsonianmag.com/arts-culture/meringue-chemistry-the-secrets-of-fluff-23039746/, 2 pages.
AU Examination Report No. 2 dated Jan. 29, 2018, issued in AU Application No. 2016231495, 9 pages.
AU Examination Report No. 2 dated Feb. 6, 2018, issued in AU Application No. 2016231495, 9 pages.
AU Notice of Acceptance of Patent Application dated Feb. 12, 2018, issued in AU Application No. 2016231495, 3 pages.
Unknown, "Material and Safety Data Sheet: Avicel-plus® BV 3720 Stabilizer", FMC BioPolymer, MSDC Ref. No. 6102800, 2008:1-9.
Arabshirazi, S. et al., "Evaluation of addition of Xanthan and Hydroxyl Propyl Methyl Cellulose gums on Chemical and Rheological properties of Sponge Cakes", Annals. of Biological Research, 2012, 3(1):589-594.
European Patent Office action dated Jul. 4, 2018, issued in Application No. 16700519.8, 6 pages.
Australian Patent Examination Report No. 1 dated Jun. 28, 2018, issued in Application No. 2016296376, 4 pages.

\* cited by examiner

Comparative Example 1A    Comparative Example 1B    Example 1

Example 2    Comparative Example 2B    Comparative Example 2A

PLANT-BASED EGG SUBSTITUTE COMPOSITIONS

CROSS-REFERENCE TO RELATED APPLICATION(S)

This application claims priority to and the benefit of U.S. Provisional Application Ser. No. 62/195,234, titled PLANT-BASED EGG SUBSTITUTE COMPOSITIONS, and filed on Jul. 21, 2015, the entire content of which is incorporated herein by reference.

BACKGROUND

Eggs are one of the most widely consumed food products in the world. In addition to being a nutritional food source in their own right, eggs are also widely used in a variety of culinary applications, including savory and sweet baking and cooking applications. For example, eggs are essential ingredients in the production of many baked goods, including cakes, breads, muffins, etc., as well as custards, and emulsifications, such as dressings and sauces. Eggs are useful in these applications because they provide a wide range of culinary properties, such as leavening, thickening, binding, coagulating, emulsifying and moisturizing.

However, despite being a good source of protein and providing other nutritional benefits, eggs are also high in cholesterol, and sometimes carry dangerous pathogens, such as *Salmonella* and *Escherichia coli*. Consequently, many people opt to avoid eating eggs in an effort to avoid ingesting the pathogens, and to minimize the risk of adverse long-term health problems from the consumption of high levels of cholesterol (e.g., cardiovascular disease). Additionally, many people are allergic to eggs, and some people eliminate eggs from their diet for personal or religious reasons. For example, a growing number of people are subscribing to a vegan diet, which excludes animal products, including eggs.

Given the growing number of people avoiding the consumption of eggs, a number of egg replacement or egg substitute products have been introduced. However, of these products, some are made with actual egg whites, and others are suitable for only certain applications. For example, Egg Beaters® (Conagra Foods, Inc.) are made from real egg whites, and therefore may carry some risk of pathogen content, and are not suitable for those following a vegan diet. Other powdered egg replacement products are egg-free, but do not provide some of the culinary properties of eggs, for example binding and moisturizing. As such, many of the powdered products on the market are not suitable egg replacements for many culinary applications. Additionally, these powdered egg replacement products typically cannot be used to prepare "eggs" or "egg dishes," such as scrambled eggs or omelets.

SUMMARY

According to embodiments of the present invention, an egg substitute composition includes a substantially egg-less dry mixture that includes a starch and/or lipid source and/or protein source, and a hydrocolloid system. The hydrocolloid system includes a mixture of hydrocolloids and a crosslinking agent. The crosslinking agent is adapted to crosslink the mixture of hydrocolloids upon the introduction of a liquid. The mixture of hydrocolloids includes a lower-temperature gelling hydrocolloid and a higher-temperature gelling hydrocolloid.

According to some embodiments, the composition may further include a liquid activator. In some embodiments, the liquid activator may include water, a milk, a brine and/or a juice. In some embodiments, the liquid activator may be present in the composition in an amount of about 60 wt % to about 95 wt % based on a total weight of the substitute composition. According to some embodiments, a temperature of the liquid activator is about 50° F. or lower.

In some embodiments, for example, the dry mixture may include a protein source. The protein source may include a plant-based protein source. For example, the protein source may include a protein derived from vegetables, legumes, seeds, grains, tubers, roots, fruits, hemp, nuts, algae, and/or seaweed. In some embodiments, for example, the protein source may include a protein derived from algae. For example, in some embodiments, the protein source may include a protein derived from a microalgae. In some embodiments, the protein source may include a microalgal protein.

The protein source and the starch and/or lipid source may be present in the dry mixture in a weight ratio of about 0:100 to 100:0 based on 100 wt % of the combination of the protein source and the starch and/or lipid source. In some embodiments, the protein source may be present in the dry mixture in an amount of about 0 wt % to about 50 wt % based on a dry weight of the dry mixture. In hydrated embodiments (i.e., embodiments including a liquid activator for hydrating the dry mixture), the protein source may be present in the composition in an amount of about 0 wt % to about 20 wt % based on a total weight of the composition.

The starch and/or lipid source may include a plant-based starch and/or lipid source. For example, the starch and/or lipid source may include a starch and/or lipid derived from vegetables, legumes, sprouted beans or legumes, seeds, grains, sprouted grains, tubers, roots, fruits, hemp, nuts, algae, seaweed, and/or isolated starches. In some embodiments, for example, the starch and/or lipid source may include a starch and/or lipid derived from an algae. For example, in some embodiments, the starch and/or lipid source may include a starch and/or lipid derived from a microalgae. In some embodiments, the starch and/or lipid source may include a microalgal flour.

The starch and/or lipid source may be present in the dry mixture in an amount of about 0 wt % to about 50 wt % based on a dry weight of the dry mixture. In hydrated embodiments (i.e., embodiments including a liquid activator for hydrating the dry mixture), the starch and/or lipid source is present in the composition in an amount of about 0 wt % to about 20 wt % based on a total weight of the composition.

In the hydrocolloid system, the higher-temperature gelling hydrocolloid may include methylcellulose and/or hydroxypropyl methylcellulose. The lower-temperature gelling hydrocolloid my include carrageenan, locust bean gum, an alginate, and/or gellan gum. In some embodiments, the gellan gum may include high acyl gellan gum.

The higher-temperature gelling hydrocollloid may be present in the mixture of hydrocolloids in an amount of about 35 wt % to about 75 wt % based on a total weight of the mixture of hydrocolloids. In some embodiments, the lower-temperature gelling hydrocolloid may be present in the mixture of hydrocolloids in an amount of about 30 wt % to about 70 wt % based on a total weight of the mixture of hydrocolloids.

In the hydrocolloid system, the crosslinking agent may include a salt having a monovalent or divalent metal cation, and an anion. In some embodiments, the monovalent or divalent metal cation of the salt may comprise a monovalent or divalent alkali metal ion or alkali earth metal ion. For example, in some embodiments, the metal cation may include $Na^+$, $K^+$, $Mg^{2+}$ and/or $Ca^{2+}$. Additionally, in some embodiments, the anion may include a lactate anion, a chloride anion, a propionate anion and/or a gluconate anion.

According to some embodiments, the dry mixture may further include a flavor additive and/or a viscosity modifier. In some embodiments, the flavor additive may include salt, a natural flavoring, an autolysed yeast and/or nutritional yeast. In some embodiments, the viscosity modifier may include cellulose and/or cellulose gum.

In some embodiments, the composition may further include an encapsulate for encapsulating the crosslinking agent during storage. In some embodiments, the composition may further include a preservative.

In some embodiments, the composition may be pasteurized, for example cold pasteurized or high pressure processed (HPP). For example, in some embodiments of the hydrated composition (in which the dry mixture is hydrated with the liquid activator), the composition may be pasteurized to prevent contamination or spoilage, and to prolong shelf-life.

According to some embodiments, the composition may be vegetarian, vegan, gluten-free, soy-free, allergen-free, and/or cholesterol-free. For example, in some embodiments, the components of the composition (e.g., the protein, starch and/or lipid sources, and/or the hydrocolloids and/or crosslinking agents in the dry mixture) may be selected such that the resulting composition may be vegetarian, vegan, gluten-free, soy-free, allergen-free, and/or cholesterol-free.

Additionally, in some embodiments, the composition may contain substantially no genetically modified components. For example, in some embodiments, the components of the composition (e.g., the protein, starch and/or lipid sources, and/or the hydrocolloids and/or crosslinking agents in the dry mixture) may be selected such that the resulting composition may be substantially free of genetically modified components.

The compositions according to embodiments of the present invention may be used in various different applications. For example, in some embodiments, the compositions may be used as a substitute for eggs in emulsions (e.g., mayonnaise and similar emulsions), or in baking mixes. Additionally, the compositions may be hydrated with the liquid activator and used in place of raw eggs in traditional applications, such as scrambled eggs, omelets, frittatas, etc.

BRIEF DESCRIPTION OF THE DRAWINGS

These and other features of embodiments of the present invention can be better understood by reference to the following detailed description when considered in conjunction with the following drawings in which.

DETAILED DESCRIPTION

Figure 1:
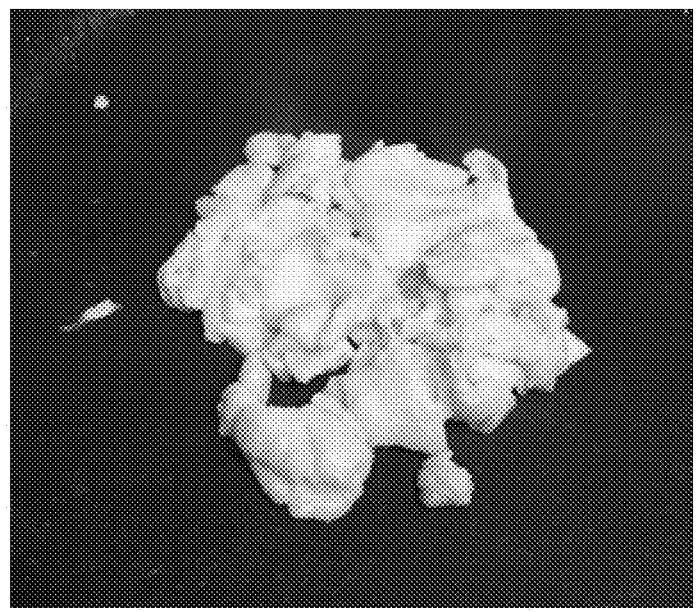
FIG. 1 is a photograph of the "scrambled egg" of Example A, prepared from an egg substitute composition according to embodiments of the present invention.

According to embodiments of the present invention, an egg substitute (or egg replacement) composition is a substantially egg-less composition that includes a protein source, a starch and/or lipid (or fat) source, and a hydrocolloid system. The egg substitute composition may further include a viscosity modifier, and/or a flavor additive. The egg substitute composition includes a solid particulate powder. In some embodiments, depending on the application, the particulate powder may be used in its solid particulate form. However, in some embodiments, again depending on the application, the particulate powder may be hydrated with a liquid activator prior to use. Throughout this disclosure and the accompanying claims, various ingredients of the egg substitute composition are described. It is understood that, even if not specifically noted, each of the ingredients are food-safe products that are suitable for use in food for human consumption.

As used herein, the term "substantially" is used as a term of approximation, and not as a term of degree, and is intended to account for the possibility of incidental impurities in the listed component. For example, the term "substantially egg-less" refers to a composition that does not include added eggs or egg components (whether egg white, egg yolk, whole egg, or any other egg component), and refers to the inclusion of any eggs or egg components in the composition only as incidental impurities in negligible amounts that do not contribute to the function or properties of the composition. In contrast, a composition that is "egg-less" or "completely egg-less" contains no measurable amount of eggs or egg components. Similarly, a composition that is "substantially free" of a listed ingredient or component includes the listed ingredient or component only in a negligible amount or as an incidental impurity, and that does not include an intentionally added amount of the listed ingredient or component. Conversely, a composition that is "free," or "completely free," of a listed ingredient or component contains no measurable amount of the listed ingredient or component.

Additionally, as used herein, the term "egg," for example, as used when describing an "egg-less" or "substantially egg-less" composition, refers to the animal product (i.e., an egg laid by a bird or fowl, such as a chicken, quail or duck) or any component of the animal product. Conversely, as used herein, the terms "egg substitute," "egg substitute composition" and like terms refer to compositions that do not include the animal product (or are "substantially egg-less" as that term is defined herein), but that can be used to simulate, replace or substitute the animal product (or any component thereof) in various applications. For example, an egg substitute composition according to embodiments of the present invention is substantially egg-less (or is egg-less or completely egg-less), but includes culinary properties that emulate egg (i.e., the animal product). Specifically, an egg substitute according to embodiments of the present invention emulates the leavening, binding, moisturizing and thickening properties of natural egg (i.e., the animal product). Indeed, according to embodiments of the present invention, the egg substitute composition emulates natural (animal) egg such that it can be used as a substitute for natural (animal) eggs in a 1:1 ratio by weight in various culinary applications, including, but not limited to, baking applications, emulsions, etc., and in "egg" dishes, such as scrambled eggs, omelets, frittatas, quiches, etc. As used herein, the "weight of the egg substitute" refers to the weight of the egg substitute after the particulate composition has been hydrated (or activated) with water (or other liquid activator, as described herein), and thus includes the weight of the powder as well as the weight of the water added to hydrate (or activate) the powder.

As noted above, in some embodiments of the present invention, the egg substitute composition is a substantially egg-less (or in some embodiments, a completely egg-less) composition that includes a protein source, a starch source, and a hydrocolloid system. Any suitable protein source, starch source and hydrocolloid sources may be used. Additionally, while the composition includes both protein and starch, the starch source may include a protein, and/or the protein source may include a starch. As such, the protein source and the starch source may be provided by the same component. In particular, in some embodiments, the protein source and the starch source may be provided in a weight ratio of about 0:100 to 100:0 based on 100 wt % of the combination of the protein source and the starch source. For example, in some embodiments, the protein source and the starch source may be provided in a weight ratio of about 25:75 to about 75:25 based on 100 wt % of the combination of the protein source and the starch source. In some embodiments, for example, the protein source and the starch source may be provided in a weight ratio of about 35:65 to about 65:35 based on 100 wt % of the combination of the protein source and the starch source. For example, in some embodiments, the protein source and the starch source may be provided in a weight ratio of about 50:50 based on 100 wt % of the combination of the protein source and the starch source.

In some embodiments, the protein source, starch source and hydrocolloid system may be plant-based, or based on components that are not derived from animal or animal byproduct sources. As used herein, the term "plant-based" refers to the vegan properties of the components, and indicates that the components are not sourced from or derived from an animal or animal product. As such, the components that are "plant-based" are substantially free, or completely free (as those terms are defined herein, above) of any animal products or animal byproducts. What constitutes an animal product or byproduct is well known in this field, and to those following a vegetarian or vegan diet. In particular, the term "animal product" refers to any animal parts, animal byproducts, or products produced by an animal. Some examples of materials that would be considered "animal products" include those parts of the animal that are consumable or typically prepared for consumption by humans (including, e.g., fat, flesh, blood, etc.). Products produced by an animal are also considered "animal products" as used herein, and refer to the products produced by an animal without slaughtering the animal, (e.g., milk, eggs, honey, etc.). "Animal byproducts" are products that are typically not consumable by themselves but are the byproducts of slaughtering animals for consumption, e.g., bones, carcasses, etc. However, animal byproducts are often processed into human consumable foodstuffs, some well-known examples of which include gelatin, casein, whey, rennet, etc. As used herein, these processed animal byproducts (e.g., gelatin, casein, whey, rennet, etc.) are encompassed by the term "animal byproducts." As described herein, "plant-based" components or ingredients are substantially free (or in some embodiments, completely free) of such animal products and byproducts.

In some embodiments, however, the substantially egg-less (or in some embodiments, the completely egg-less) composition can be suitable for a vegan diet and/or a vegetarian diet. For example, in embodiments in which the composition is suitable for a vegan diet, the composition may include primarily plant-based components such that the composition contains substantially no animal products, animal byproducts, or substantially no components derived from these animal sources. In some embodiments, however, the composition is suitable for a vegetarian diet, and is not necessarily suitable for a vegan diet. In these embodiments, for example, the composition may remain substantially free of animal meat (e.g., fat, flesh, blood, etc.), but may contain animal byproducts (e.g., gelatin, casein, whey, etc.) and/or components sourced from animals (including, e.g., milk, etc.).

In the substantially egg-less (or in some embodiments, the completely egg-less) composition, the protein source may be any suitable protein source. In some embodiments, for example, the protein source may include a component that is not sourced from an animal, animal product and/or animal by-product. Indeed, the protein source may be any suitable plant-based protein, and may be provided in any suitable form, including as a concentrate or isolate, in liquid form, or as a particulate powder. Some nonlimiting examples of suitable proteins include those derived from vegetables and legumes (e.g., spinach, Brussels sprouts, peas, beans (including garbanzo (or chick pea), fava, pinto, kidney, lima beans, etc.), soy, lentils), seeds (e.g., chia, lupine), grains (e.g., corn, rice, wheat, including gluten, quinoa, amaranth, buckwheat, millet), tubers and roots (e.g., potatoes, sweet potatoes), fruits (e.g., tomatoes, sun-dried tomatoes, cranberries, pumpkins), hemp, nuts (e.g., almond, cashew, pistachio), algae (e.g., chlorella, spirulina), seaweed, etc. However, in some embodiments, the protein source includes an algal protein, i.e., a protein derived from an algae, for example a microalgae. Any suitable protein derived from an algae may be used. In some embodiments, the algal protein includes a protein derived from a microalgae. For example, in some embodiments, the protein source may include the microalgae biomass described in U.S. Patent Publication No. 2010/0239712 in the name of Brooks, et al., titled FOOD COMPOSITIONS OF MICROALGAL BIOMASS, and filed on Oct. 14, 2009, the entire content of which is incorporated herein by reference. In some embodiments, the protein source may include the whole microalgal protein product commercially available as ALGAVIA Protein from Solazyme, Inc. (San Francisco, Calif.), or ALGILITY HP Whole Algal Protein from Roquette Freres (France). It is understood, also, that any combination of different protein sources may be used. Also, as discussed above, the protein source and the starch source in the composition may be provided by the same component. As such, in some embodiments, the composition may not include a separate protein source, and instead, the protein may be provided in the starch source.

As discussed above, the substantially egg-less (or in some embodiments, the completely egg-less) composition may be a particulate powder, or a fluid, liquid or gelatinous composition in which the particulate powder is hydrated (or activated) with a liquid activator. In embodiments in which the substantially egg-less (or in some embodiments, the completely egg-less) composition is a particulate powder, the protein source (i.e., as a separate component of the composition, separate from the starch source) may be present in the solid particulate powder in an amount of about 0 wt % (e.g., in compositions in which the protein is provided by the starch source) to about 50 wt % based on the dry weight of the composition. In some embodiments, the protein source (i.e., as a separate component of the composition, separate from the starch source) may be present in the solid particulate powder in a positive amount (i.e., greater than 0 wt %) to about 50 wt % based on the dry weight of the composition. In some embodiments, for example, the protein source may be present in the solid particulate powder in an amount of about 10 wt % to about 35 wt %. In some embodiments, for example, the protein source may be present in the solid particulate powder in an amount of about 12 wt % to about 22%, or about 14% to about 20 wt % based on dry weight of the composition. For example, in some embodiments, the protein source may be present in the particulate powder composition in an amount of about 15 wt %, 16 wt %, 17 wt %, 18 wt %, 19 wt % or 20 wt % based on dry weight of the composition. For example, in some embodiments in which the protein source includes an algal protein or a microalgal protein (as described above), the protein source may be present in the solid particulate powder in an amount of about 12 wt % to about 22%, or about 14% to about 20 wt % based on dry weight of the composition.

In embodiments in which the substantially egg-less (or in some embodiments, the completely egg-less) composition is a fluid, liquid or gelatinous composition (i.e., rehydrated particulate powder), the protein source (i.e., as a separate component of the composition, separate from the starch source) may be present in the composition in an amount of about 0 wt % to about 20 wt %, for example in a positive amount (i.e., greater than 0 wt %) to about 20 wt % based on the total weight of the composition. For example, in some embodiments, the protein source may be present in the composition in an amount of about 0 wt % to about 10 wt %, or in a positive amount (i.e., greater than 0 wt %) to about 10 wt % based on the total weight of the composition. In some embodiments, for example, the protein source may be present in the composition in an amount of about 0 wt % to about 5 wt %, or in a positive amount (i.e., greater than 0 wt %) to about 5 wt % based on the total weight of the composition. In some embodiments, the protein source may be present in the composition in an amount of about 1 wt % to about 4 wt % based on the total weight of the composition. In some embodiments, for example, the protein source may be present in the composition in an amount of about 1 wt % to about 3 wt %, or about 1 wt % to about 2 wt % based on the total weight of the compositions. For example, in some embodiments, the protein source may be present in the composition in an amount of about 1.3 wt %, 1.35 wt %, 1.4 wt %, 1.45 wt %, 1.5 wt % or 1.55 wt % based on the total weight of the composition.

Like the protein source, the starch and/or lipid (or fat) source in the substantially egg-less (or in some embodiments, the completely egg-less) composition may be any suitable starch source. As used herein, the term "starch and/or lipid (or fat) source" and the term "starch source" are used interchangeably, and both terms refer to the starch and/or lipid source which includes either or both a starch (or modified starch) and/or a lipid (or fat) in the component. For example, in some embodiments, the starch source may be a component that is not sourced from an animal, animal product and/or animal byproduct. Indeed, the starch source may be any suitable plant-based starch or plant-based modified starch. Some nonlimiting examples of suitable starches, modified starches and/or lipids (or fats) include those derived from vegetables and legumes (e.g., peas, beans (including garbanzo, fava, pinto, kidney, lima beans, mung beans, etc.), soy, lentils) and sprouted beans (including garbanzo (or chick pea), fava, pinto, kidney, lima beans, mung beans, etc.), soy, lentils), seeds (e.g., chia, lupine), grains and sprouted grains (e.g., oats, corn, rice, wheat, including gluten, quinoa, amaranth, buckwheat, millet), tubers and roots (e.g., potatoes, sweet potatoes), fruits (e.g., tomatoes, sun-dried tomatoes, cranberries, pumpkins), hemp, nuts (e.g., coconut, almond, cashew, pistachio), algae (e.g., chlorella, spirulina), seaweed, isolated starches (e.g., corn starch, arrowroot starch, tapioca starch, etc.), etc. However, in some embodiments, the starch source includes an algal flour, i.e., a flour derived from an algae, for example a microalgae. A flour derived from any suitable algae may be used. In some embodiments, the algal flour includes a flour derived from a microalgae. For example, in some embodiments, the starch source may include the microalgal flour described in U.S. Patent Publication No. 2010/0303989 in the name of Brooks, et al., titled MICROALGAL FLOUR, and filed on Jan. 8, 2010, the entire content of which is incorporated herein by reference. In some embodiments, the starch source may include the whole microalgal flour product commercially available as ALGAVIA Lipid Powder from Solazyme, Inc. (San Francisco, Calif.), or ALGILITY HP Whole Algal Flour from Roquette Freres (France). It is understood, also, that any combination of starch sources may be used. Also, as discussed above, the protein source and the starch source in the composition may be provided by the same component. As such, in some embodiments, the composition may not include a separate starch source, and instead, the starch may be provided in the protein source.

In embodiments in which the substantially egg-less (or in some embodiments, the completely egg-less) composition is a particulate powder, the starch source (as a separate component in the composition, separate from the protein source) may be present in the solid particulate powder in an amount of about 0 wt % to about 50 wt %, for example in a positive amount (i.e., greater than 0 wt %) to about 50 wt % based on the dry weight of the composition. For example, in some embodiments, the starch source may be present in the solid particulate powder in an amount of about 15 wt % to about 45 wt % based on dry weight of the composition. In some embodiments, for example, the starch source may be present in the solid particulate powder in an amount of about 20 wt % to about 40%, or about 25% to about 40 wt % based on dry weight of the composition. For example, in some embodiments, the starch source may be present in the particulate powder composition in an amount of about 24 wt %, 27 wt %, 30 wt %, 33 wt % or 36 wt % based on dry weight of the composition.

In embodiments in which the substantially egg-less (or in some embodiments, the completely egg-less) composition is a fluid, liquid or gelatinous composition, the starch source (as a separate component in the composition, separate from the protein source) may be present in the composition in an amount of about 0 wt % to about 20 wt %, or in a positive amount (i.e., greater than 0 wt %) to about 20 wt % based on the total weight of the composition. In some embodiments, for example, the starch source may be present in the composition in an amount of about 1 wt % to about 10 wt %, for example about 1 wt % to about 5 wt % based on the total weight of the composition. In some embodiments, for example, the starch source may be present in the composition in an amount of about 2 wt % to about 5 wt %, or about 2 wt % to about 4 wt % based on the total weight of the compositions. For example, in some embodiments, the starch source may be present in the composition in an amount of about 1.5 wt %, 2.0 wt %, 2.5 wt %, 3 wt % or 3.5 wt % based on the total weight of the composition.

In some embodiments, at least one of the starch source and/or the protein source of the substantially egg-less (or in some embodiments, the completely egg-less) composition contains an algal component. For example, in some embodiments, as discussed above, the substantially egg-less (or in some embodiments, the completely egg-less) composition includes at least one of an algal protein source (e.g., a microalgal protein source as discussed above) and/or an algal starch source (e.g., a microalgal starch source as discussed above). However, in some embodiments, the substantially egg-less (or in some embodiments, the completely egg-less) composition includes only one of an algal protein source or an algal starch source. In these embodiments, one of the protein source or the starch source includes an algal product, as discussed above, and the other of the protein source and the starch source includes a plant-based product that is non-algal. In some embodiments, for example, the substantially egg-less (or in some embodiments, the completely egg-less) composition may include an algal (e.g., microalgal) starch source, but a non-algal protein source, and in some alternative embodiments, the substantially egg-less (or in some embodiments, the completely egg-less) composition may include an algal (e.g., microalgal) protein source, but a non-algal starch source.

The hydrocolloid system plays an important role in the substantially egg-less (or in some embodiments, the completely egg-less) egg substitute composition. In particular, upon activation with a liquid (e.g., water), the particles of the hydrocolloid system interact with the liquid to build a crosslinked structure which provides the egg substitute composition with culinary properties emulating natural egg. Additionally, the crosslinked (or network) structure built by the hydrocolloid system (upon activation with the liquid activator) allows the egg substitute composition to be cooked like a natural egg, e.g., scrambled, formed into an omelet, used in a batter, or used as a binder between two different foods (e.g., as a binder for attaching breading or the like to the surface of a food). For example, in the scrambled and omelet applications (and similar applications), the network structure built by the hydrocolloid system allows the eggs to develop volume and bounce (or spring) when cooked, imparting a spongy and airy texture to the cooked composition that is on part with similar characteristics found in scrambled natural eggs or omelets made with natural eggs. Similarly, the network structure created by the interaction of the particulate hydrocolloids with the liquid activator enables the composition to function effectively in both leavening (as needed in batter, and similar, applications) and binding (as needed in coating, and similar, applications).

The network structure imparted by the hydrocolloid system also enables the egg substitute composition to function effectively in baking applications, or other applications in which the egg substitute may be cooked more indirectly. For example, in many baking applications, eggs are typically used as a moisturizing (or hydrating) ingredient, and/or as a leavening agent. The network structure of the hydrocolloid system enables the substantially egg-less (or in some embodiments, the completely egg-less) composition to emulate the properties of natural eggs, and therefore function in a fashion similar to natural eggs. Indeed, activation of the hydrocolloid system with the liquid activator not only enables the reactions leading to the network structure responsible for emulating the leavening property essential for effective baking, but also provides the moisture necessary for the egg substitute to emulate the hydrating properties of natural eggs.

To provide the crosslinked (or network) structure responsible for emulating many of the properties in natural eggs, the hydrocolloid system includes a mixture of hydrocolloids and a crosslinking (or gelling) agent. The mixture of hydrocolloids includes at least one (or one or more) higher-temperature gelling hydrocolloid, and at least one (or one or more) lower-temperature gelling hydrocolloid. As used herein, the terms "higher-temperature gelling" and "lower-temperature gelling" are used in reference to each other. In particular, the higher-temperature gelling hydrocolloid gels (or sets) at a temperature higher than the temperature at which the lower-temperature gelling hydrocolloid gels (or sets). Indeed, in some embodiments, the higher-temperature gelling hydrocolloid includes a heat-setting hydrocolloid (as that term is understood by those of ordinary skill in the art), and the lower-temperature gelling hydrocolloid includes an ionotropic or cold-setting hydrocolloid (as those terms are understood by those of ordinary skill in the art). In some embodiments, for example, the lower-temperature gelling hydrocolloid may include a carrageenan, a locust bean gum, an alginate (e.g., sodium alginate) and/or a gellan gum. Additionally, in some embodiments, the higher-temperature gelling hydrocolloid may include a modified cellulose (e.g., methylcellulose and/or hydroxypropyl methylcellulose). For example, in some embodiments, the lower-temperature gelling hydrocolloid may include carrageenan and/or gellan gum, and the higher-temperature gelling hydrocolloid may include methylcellulose.

The mixture of hydrocolloids provides a crosslinked network structure that is stable at both high temperatures (e.g., at cooking temperatures, including those encountered during baking, frying, sautéing, etc.) and low temperatures (e.g., temperatures achieved upon cooling after cooking, or even upon refrigeration or freezing). In particular, while methylcellulose can provide a stable gel at higher temperatures, such as those encountered during cooking, and while the food remains hot or warm, a gel (or network) created by the higher-temperature gelling hydrocolloid (e.g., methylcellulose) alone will begin to reverse as the product cools. In contrast, the lower-temperature gelling hydrocolloid(s) (e.g., carrageenan and/or gellan gum) can provide stable gels at lower temperatures, such as warm temperatures (i.e., those not hot enough to cook food, but that are higher than room temperature), those resulting from the cooling of cooked food, or in refrigeration or freezing environments. Accordingly, in embodiments of the present invention, the mixture of hydrocolloids includes a mixture of lower-temperature gelling hydrocolloids and higher-temperature gelling hydrocolloids in order to provide a gel (or network structure) that is stable at both higher and lower temperatures.

The mixture of hydrocolloids may include any suitable ratio of the hydrocolloids (i.e., the higher-temperature gelling hydrocolloid and the lower-temperature gelling hydrocolloid) to each other. In particular, the mixture of hydrocolloids may include an equal amount of the higher-temperature gelling hydrocolloid(s) and the lower-temperature hydrocolloid(s), or may include these hydrocolloids in any desired weight ratio. For example, in some embodiments, the mixture of hydrocolloids includes more higher-temperature gelling hydrocolloid than the lower-temperature gelling hydrocolloid. Additionally, in some embodiments, the lower-temperature gelling hydrocolloid may include any suitable such hydrocolloid (e.g., carrageenan, locust bean gum, an alginate, or gellan gum) or mixture of such hydrocolloids (e.g., a combination of carrageenan and gellan gum). When the lower-temperature gelling hydrocolloid includes a combination of hydrocolloids, the combination may include any suitable ratio of the different lower-temperature hydrocolloids to each other. For example, in embodiments including a combination of gellan gum and carrageenan as the lower-temperature gelling hydrocolloid, the combination may include either more gellan gum than carrageenan, more carrageenan than gellan gum, or an equal amount of gellan gum and carrageenan. Additionally, in some embodiments, the mixture of hydrocolloids may include more of the higher-temperature gelling hydrocolloid (e.g., methylcellulose) than the lower-temperature gelling hydrocolloid(s) (e.g., carrageenan, locust bean gum, an alginate, and/or gellan gum). However, in other embodiments, the mixture of hydrocolloids may include more lower-temperature gelling hydrocolloids (e.g., carrageenan, locust bean gum, an alginate, and/or gellan gum) than higher-temperature gelling hydrocolloids (e.g., methylcellulose and/or hydroxypropyl methylcellulose). It is understood, also, that additional hydrocolloids may be added to the mixture, including those that may not be clearly classified as lower-temperature gelling or higher-temperature gelling hydrocolloids, as those terms are defined herein. Nonlimiting examples of suitable such additive hydrocolloids may include any hydrocolloids suitable for use in food, including, for example, guar gum, locust bean gum, tara gum, tamarind seed gum, pectins, amidated pectins, agar-agar, aliginates, amidated alginates, propylene glycol alginates, starches, modified starches, cellulose, cellulose derivatives (e.g, methylcellulose, hydroxypropyl methylcellulose, carboxymethylcellulose, hydroxypropyl cellulose, microcrystalline cellulose), furcelleran, larch gum, xanthan, dextran, curdlan, scleroglucan, fenugreek gum, Konjac, acacia gum/gum arabic, cassia gum, gum tragacanth, gellan gum, carrageenan and pullulan.

In some exemplary embodiments, the higher-temperature gelling hydrocolloid (e.g., methylcellulose and/or hydroxypropyl methylcellulose) is present in the mixture of hydrocolloids in an amount of about 35 wt % to about 75 wt % based on the total weight of the mixture of hydrocolloids (i.e., the total combined weight of the higher-temperature gelling hydrocolloid(s) and the lower-temperature gelling hydrocolloid(s)). In some embodiments, for example, the higher-temperature gelling hydrocolloid (e.g., methylcellulose and/or hydroxypropyl methylcellulose) is present in the mixture of hydrocolloids in an amount of about 45 wt % to about 70 wt %, based on a total weight of the mixture of hydrocolloids. For example, in some embodiments, the higher-temperature gelling hydrocolloid may be present in the mixture of hydrocolloids in an amount of about 50 wt % to about 70 wt % based on the total weight of the mixture of hydrocolloids. In some embodiments, the higher-temperature gelling hydrocolloid is present in the mixture of hydrocolloids in an amount of about 45 wt % to about 68 wt %, for example, about 50 wt %, 52 wt %, 54 wt %, 56 wt %, 58 wt %, 60 wt %, 62 wt %, 64 wt %, 66 wt %, or 68 wt % based on the total weight of the mixture of hydrocolloids.

In some exemplary embodiments, the lower-temperature gelling hydrocolloid (e.g., carrageenan, locust bean gum, and/or gellan gum) is present in the mixture of hydrocolloids in an amount of about 30 wt % to about 70 wt % based on the total weight of the mixture of hydrocolloids (i.e., the total combined weight of the higher-temperature gelling hydrocolloid(s) and the lower-temperature gelling hydrocolloid(s)). In some embodiments, for example, the lower-temperature gelling hydrocolloid (e.g., carrageenan, locust bean gum, and/or gellan gum) is present in the mixture of hydrocolloids in an amount of about 40 wt % to about 65 wt %, based on a total weight of the mixture of hydrocolloids. For example, in some embodiments, the lower-temperature gelling hydrocolloid may be present in the mixture of hydrocolloids in an amount of about 45 wt % to about 65 wt % based on the total weight of the mixture of hydrocolloids. In some embodiments, the lower-temperature gelling hydrocolloid may be present in the mixture of hydrocolloids in an amount of about 40 wt % to about 60 wt %, for example, about 40 wt %, 44 wt %, 48 wt %, 52 wt %, 56 wt % or 60 wt % based on the total weight of the mixture of hydrocolloids.

Any suitable lower-temperature gelling hydrocolloid can be used, as discussed above. In some embodiments, for example, the lower-temperature gelling hydrocolloid may include carrageenan, locust bean gum, an alginate, and/or gellan gum. In some embodiments, the lower-temperature gelling hydrocolloid may include a carrageenan, which can include any suitable carrageenan, including, for example, kappa carrageenan, lambda carrageenan and/or iota carrageenan. Both kappa and iota carrageenan result in a stable network structure suitable for emulating the properties of natural egg. However, kappa carrageenan forms a stable and brittle gel that is desirable for emulating the properties of natural egg. Iota carrageenan also produces a stable and desirable gel, but the network is somewhat less elastic than the one produced by kappa carrageenan. Also, while lambda carrageenan, by itself, may not form a gel, the lambda carrageenan can be included in a carrageenan source (e.g., as a mixture of lambda carrageenan with either or both kappa and/or iota carrageenan). In such a mixture, the lambda carrageenan can serve to stabilize and/or strengthen the gel formed by the kappa and/or iota carrageenan. The carrageenan (whether kappa, lambda and/or iota) may be present in the lower-temperature gelling hydrocolloid in an amount of about 0 wt % to about 100 wt %, for example in a positive amount (i.e., greater than 0 wt %) to about 100 wt % based on the total amount of the lower-temperature hydrocolloid(s). In some embodiments, for example, the carrageenan may be present in the lower-temperature hydrocolloid(s) in an amount of about 0 wt % to about 50 wt %, for example, in a positive amount (i.e., greater than 0 wt %) to about 50 wt % based on a total weight of the lower-temperature hydrocolloid(s). For example, in some embodiments, the carrageenan may be present in the lower-temperature hydrocolloid(s) in an amount of about 20 wt % to about 50 wt % based on the total weight of the lower-temperature hydrocolloid(s). In some embodiments, the carrageenan is present in the lower-temperature hydrocolloid(s) in an amount of about 25 wt % to about 45 wt %, for example, about 30 wt %, 34 wt %, 38 wt % or 42 wt % based on the total weight of the lower-temperature hydrocolloid(s).

In embodiments in which a gellan gum is present in the lower-temperature hydrocolloid, any suitable gellan gum can be used, for example, high-acyl gellan gums and/or low acyl gellan gums can be used. However, in some embodiments, the gellan gum includes a high acyl-gellan gum. High-acyl gellan gums can produce strong gels that produce a network structure that is desirable for emulating the properties of natural egg. Low-acyl gellan gums can also produce network structures that are useful in the egg substitute (or replacement) compositions according to embodiments of the present invention, but the gels produced using low-acyl gellan gums may require the addition of a sequestrant (e.g., sodium citrate (e.g., at neutral pH), sodium EDTA (e.g., at neutral to caustic pH), sodium hexametaphosphate (e.g., at acidic pH)) for proper hydration.

The gellan gum (whether high-acyl or low-acyl) may be present in the lower-temperature hydrocolloid(s) in an amount of about 0 wt % to about 100 wt %, for example in a positive amount (i.e., greater than 0 wt %) to about 100 wt % based on the total weight of the lower-temperature gelling hydrocolloid(s). In some embodiments, for example, the gellan gum may be present in the lower-temperature hydrocolloid(s) in an amount of about 0 wt % to about 80 wt %, for example in a positive amount (i.e., greater than 0 wt %) to about 80 wt % based on a total weight of the lower-temperature hydrocolloid(s). For example, in some embodiments, the gellan gum may be present in the lower-temperature hydrocolloid(s) in an amount of about 35 wt % to about 80 wt % based on the total weight of the lower-temperature hydrocolloid(s). In some embodiments, the gellan gum is present in the lower-temperature hydrocolloid(s) in an amount of about 40 wt % to about 75 wt %, for example, about 50 wt %, 54 wt %, 58 wt %, 62 wt %, 66 wt % or 70 wt % based on the total weight of the lower-temperature hydrocolloid(s).

The crosslinking agent (or gelling agent) in the hydrocolloid system is not particularly limited, and may be any crosslinking agent capable of crosslinking molecules of the hydrocolloids in the mixture to form a stable crosslinked network structure. In some embodiments, the crosslinking agent includes a salt having a monovalent or divalent metal cation, and a suitable anion. The monovalent or divalent metal cation of the salt may include any suitable such metal cation, for example, any monovalent or divalent alkali metal ion or alkali earth metal ion. In some embodiments, for example, the metal cation may include $Na^+$, $K^+$, $Me^{2+}$ and/or $Ca^{2+}$.

The anion of the salt is not particularly limited, and may be any anion capable of forming a salt with the monovalent or divalent cation. Indeed, it is the cation of the salt that interacts with the hydrocolloids (and particularly the lower-temperature gelling hydrocolloids (e.g., the ionotropic or cold-setting hydrocolloids)) in the mixture of hydrocolloids to stabilize the network structure, and the anion does not participate in this function. Instead, the salt of the crosslinking agent dissociates upon the addition of the liquid activator, allowing the cation to interact with the hydrocolloids while the anion remains inactive with respect to network formation. As such, the choice of anion is not limited so long as the anion is compatible with the selected cation. For example, the anion may be any food-safe anion, including but not limited to, lactate anions, chloride anions, propionate anions, gluconate anions, phosphate anions, etc.

In some embodiments, the salt of the crosslinking agent includes a salt of a divalent cation, e.g., $Ca^{2+}$ or $Mg^{2+}$. For example, in some embodiments, the salt of the crosslinking agent includes a lactate, chloride, propionate and/or gluconate salt of a divalent cation, e.g., calcium or magnesium lactates, chlorides, propionates and/or gluconates. It is understood, also, that a mixture of different salts can be used as the crosslinking agent, in which case, the crosslinking agent may include more than one type of cation, and/or more than one type of anion.

In some embodiments, the salt of the crosslinking agent includes a salt of a monovalent cation, e.g., $Na^+$ or $K^+$. For example, in some embodiments, the salt of the crosslinking agent includes a lactate, chloride, propionate and/or gluconate salt of a monovalent cation, e.g., sodium or potassium lactates, chlorides, propionates and/or gluconates. It is understood, also, that a mixture of different salts can be used as the crosslinking agent, in which case, the crosslinking agent may include more than one type of cation, and/or more than one type of anion. Additionally, any combination of monovalent and/or divalent cations can be used with any one or combination of anions.

As noted above, upon addition of the liquid activator to the substantially egg-less (or in some embodiments, the completely egg-less) egg substitute composition, the salt(s) of the crosslinking agent dissociates into the component cations and anions. Upon this dissociation, the cations from the salts interact with the hydrocolloids in the mixture of hydrocolloids, crosslinking the molecules of the hydrocolloids to each other, thereby stabilizing the network structure formed from the interaction of the hydrocolloids with each other. For example, gellan gum is made up of random coils that form double helices. In the environment created upon addition of the liquid activator (e.g., an aqueous environment created by the addition of water), these helices aggregate to form 3-dimensional networks. Both monovalent ($Na^+$, $K^+$) and divalent ($Ca^{2+}$, $Mg^{2+}$) cations stabilize the network by cross-linking the double helices of the lower-temperature gelling hydrocolloids (e.g., carrageenan and/or gellan gum). In particular, gellan gum includes carboxylate groups that bind to either the monovalent or divalent cations to form this bridge. As discussed above, both monovalent cations (such as $Na^+$, $K^+$) and divalent cations (such as $Ca^{2+}$, $Mg^{2+}$) are effective in this crosslinking scheme. However, in some embodiments, for example those that include at least some gellan gum, divalent cations may be more effective in gel formation with the gellan gum than monovalent cations. More specifically, divalent cations cross-link the double helices of the gellan gum directly, i.e., without intervening moieties between the crosslinks, creating a Double Helix-$M_D^{2+}$-Double Helix structure (where $M_D$ is the divalent cation). In contrast, monovalent cations indirectly cross-link the helices using water molecules, creating a Double Helix-$M_M^+$-$H_2O$-$M_M^+$-Double Helix structure (where $M_M$ is the monovalent cation). The cations perform a similar function with respect to the carrageenan, crosslinking coils of carrageenan molecules to form 3D network structures, thereby stabilizing the gel (or network) created by activation of the mixture of hydrocolloids with the liquid activator.

In embodiments in which the substantially egg-less (or in some embodiments, the completely egg-less) composition is a particulate powder, the crosslinking agent may be present in the solid particulate powder in an amount of about 1 wt % to about 15 wt % based on the dry weight of the composition. For example, in some embodiments, the crosslinking agent may be present in the solid particulate powder in an amount of about 2 wt % to about 10 wt % based on dry weight of the composition. In some embodiments, for example, the crosslinking agent may be present in the solid particulate powder in an amount of about 3 wt % to about 8%, or about 4% to about 7 wt % based on dry weight of the composition. For example, in some embodiments, the crosslinking agent may be present in the particulate powder composition in an amount of about 4 wt %, 4.5 wt %, 5 wt %, 5.5 wt % or 6 wt % based on dry weight of the composition.

In embodiments in which the substantially egg-less (or in some embodiments, the completely egg-less) composition is a fluid, liquid or gelatinous (i.e., rehydrated powder) composition, the crosslinking agent may be present in the composition in an amount of about 0.05 wt % to about 5 wt % based on the total weight of the composition. In some embodiments, for example, the crosslinking agent may be present in the composition in an amount of about 0.1 wt % to about 2 wt %, for example about 0.1 wt % to about 1.5 wt % based on the total weight of the composition. In some embodiments, for example, the crosslinking agent may be present in the composition in an amount of about 0.1 wt %, 0.5 wt %, 1 wt % or 1.5 wt % based on the total weight of the composition.

In some embodiments, the composition may be provided (e.g., sold) as a fluid, liquid or gelatinous (i.e., rehydrated powder) composition that is stable under refrigeration conditions. In some such embodiments, the crosslinking agent may be encapsulated or otherwise protected from interaction with the hydrocolloids until a set or threshold temperature is reached. This encapsulation can enable the composition to be sold in liquid (or hydrated) form while remaining shelf-stable for a set period of time. For example, in some embodiments, the crosslinking agent may be encapsulated in an encapsulate (such as, e.g., an oil (including hydrogenated or partially hydrogenated oils and/or fractionated oils) or wax) that is solid at room temperature, and that has a melting point higher than room temperature, e.g., 100° F. or higher. Having a melting point higher than room temperature enables the composition to remain shelf-stable prior to purchase and/or use, and to promote interaction of the crosslinking agent with the hydrocolloids upon use, e.g., upon even mild or moderate heating. Suitable materials for use as the encapsulate would be discernible to those of ordinary skill in the art, but some nonlimiting examples of the encapsulate include coconut oil, rapeseed oil, palm oil, beeswax, sunflower wax, etc.

The encapsulate can be used in any suitable amount to effectively protect the crosslinking agent from interaction with the hydrocolloids at room temperature, or during storage and before use. For example, the encapsulate may be present in the composition in an amount of about 0 wt % to about 5 wt %, or in a positive amount (i.e., greater than 0 wt %) to about 5 wt % based on the total weight of the composition. For example, in some embodiments, the encapsulate may be present in an amount of about 0.05 wt % to about 5 wt % based on the total weight of the composition. In some embodiments, for example, the encapsulate may be present in the composition in an amount of about 0.1 wt % to about 2 wt %, for example about 0.1 wt % to about 1.5 wt % based on the total weight of the composition. In some embodiments, for example, the encapsulate may be present in the composition in an amount of about 0.1 wt %, 0.5 wt %, 1 wt % or 1.5 wt % based on the total weight of the composition.

In some embodiments, in order to increase the storage life of the composition, when provided as a fluid, liquid or gelatinous (i.e., rehydrated powder) composition, the composition can be stored under refrigeration or freezing conditions, may be subjected to high pressure processing (HPP) or cold pasteurization, or may include a preservative or preservative system. The preservative or preservative system may include any suitable material for preserving or otherwise prolonging the storage life of the composition. Some nonlimiting examples of suitable such preservatives include cultured dextrose, benzoates (e.g. sodium), sorbates (e.g., potassium), lactates (e.g., sodium), etc.

The liquid activator in the hydrocolloid system is not particularly limited, and can be any liquid suitable for activating the mixture of hydrocolloids. For example, the liquid activator may include water, milk (including, but not limited to animal milks, nut milks, plant-based milks, etc.), juice (including vegetable, fruit, or other plant juice), brines (including fluid or liquid used to soak beans, legumes, etc.), etc. In some embodiments, for example, the liquid activator includes water. It is understood, however, that any combination of different types of liquids can be used as the liquid activator (e.g., a mixture of water and a milk, water and a juice, a milk and a juice, etc.). In some embodiments, the liquid activator includes at least some water, and in some embodiments, the liquid activator is water alone. The liquid activator may also include a crosslinking agent, such as the crosslinking agent discussed above in connection with the hydrocolloid system. For example, in some embodiments, the liquid activator may include a calcium-enriched plant-based milk.

The liquid activator may be present in the egg substitute composition in an amount of about 60 wt % to about 95 wt %, based on a total weight of the egg substitute composition. For example, in some embodiments, the liquid activator may be present in the egg substitute composition in an amount of about 70 wt % to about 95 wt %, or about 75 wt % to about 95 wt % based on the total weight of the egg substitute composition. In some embodiments, the liquid activator is present in the egg substitute composition in an amount of about 85 wt % to about 95 wt %, for example, about 86 wt %, 87 wt %, 88 wt %, 89 wt %, 90 wt %, 91 wt %, 92 wt %, 93 wt %, 94 wt % or 95 wt % based on the total weight of the egg substitute composition.

The temperature of the liquid activator upon introduction to the particulate composition is not particularly limited. However, in some embodiments, the liquid activator is introduced to the particulate composition at a cold temperature. For example, in some embodiments, the temperature of the liquid activator is less than about 50° F., or 50° F. or lower. Introducing the liquid activator having a temperature within this range ensures activation of the hydrocolloids (e.g., the methylcellulose).

In addition to the starch source, protein source, and hydrocolloid system, in some embodiments, the egg substitute composition may further include certain additives, for example, to enhance flavor, or to adjust viscosity. Any suitable flavor additives may be used, including, but not limited to, salt and other seasonings, natural flavorings, yeast extracts (e.g., autolysed yeast) and nutritional yeast. In some embodiments, for example, the egg substitute composition includes salt as a flavor additive, and any suitable salt may be used. For example, in some embodiments, the salt may include a black salt (e.g., Kala Namak), which is high in sulfur content, enhancing the "eggy" flavor of the egg substitute composition.

The flavor additives may be included in the egg substitute composition in any suitable amount depending on the desired flavor of the compositions. For example, in embodiments in which the substantially egg-less (or in some embodiments, the completely egg-less) composition is a particulate powder, the flavor additives may be present (collectively) in the solid particulate powder in an amount of about 0 wt % to about 15 wt %, or in a positive amount (i.e., greater than 0 wt %) to about 15 wt % based on the dry weight of the particulate composition. In some embodiments, for example, the flavor additives may be present (collectively) in the solid particulate powder in an amount of about 0 wt % to about 10 wt %, or in a positive amount (i.e., greater than 0 wt %) to about 10 wt % based on the dry weight of the particulate composition. In some embodiments, for example, the flavor additives may be present (collectively) in the solid particulate powder in an amount of about 1 wt % to about 8 wt %, about 2 wt % to about 7 wt %, or about 3 wt % to about 6 wt %. In some embodiments, for example, the flavor additives may be present (collectively) in the solid particulate powder in an amount of about 2 wt %, 3 wt %, 4 wt %, 5 wt %, 6 wt %, 7 wt % or 8 wt % based on dry weight of the composition.

In embodiments in which the substantially egg-less (or in some embodiments, the completely egg-less) composition is a fluid, liquid or gelatinous (i.e., rehydrated powder) composition, the flavor additives may be present (collectively) in the composition in an amount of about 0 wt % to about 5 wt %, for example, in a positive amount (i.e., greater than 0 wt %) to about 5 wt % based on the total weight of the composition. In some embodiments, for example, the flavor additives may be present (collectively) in the composition in an amount of about 0 wt % to about 2 wt %, or in a positive amount (i.e., greater than 0 wt %) to about 2 wt % based on the total weight of the compositions. In some embodiments, the flavor additives may be present (collectively) in the composition in an amount of about 0.1 wt % to about 1.5 wt %, or 0.2 wt % to about 1 wt % based on the total weight of the composition. For example, in some embodiments, the flavor additives may be present (collectively) in the composition in an amount of about 0.2 wt %, 0.3 wt %, 0.4 wt %, 0.5 wt %, 0.6 wt %, 0.7 wt %, 0.8 wt %, 0.9 wt % or 1 wt % based on the total weight of the composition.

In some embodiments, the egg substitute composition includes salt (e.g., sea salt, black salt (e.g., Kala Namak), etc.) as a flavor additive. The salt may be present in the composition in any suitable amount depending on the desired "saltiness" and "eggy" flavor. For example, in embodiments in which the substantially egg-less (or in some embodiments, the completely egg-less) composition is a particulate powder, the salt may be present in the solid particulate powder in an amount of about 0 wt % to about 5 wt %, or in a positive amount (i.e., greater than 0 wt %) to about 5 wt % based on the dry weight of the particulate composition. In some embodiments, for example, the salt may be present in the solid particulate powder in an amount of about 0 wt % to about 3 wt %, or in a positive amount (i.e., greater than 0 wt %) to about 3 wt % based on the dry weight of the particulate composition. In some embodiments, the salt may be present in the solid particulate powder in an amount of about 0.5 wt % to about 2.5 wt %, or 1 wt % to about 3.5 wt % based on the dry weight of the composition. In some embodiments, for example, the salt may be present in the solid particulate powder in an amount of about 1.6 wt %, 1.7 wt %, 1.8 wt %, 1.9 wt %, 2.0 wt %, 2.1 wt %, 2.2 wt %, 2.3 wt %, 2.4 wt % or 2.5 wt % based on the dry weight of the composition.

In embodiments in which the substantially egg-less (or in some embodiments, the completely egg-less) composition is a fluid, liquid or gelatinous (i.e., rehydrated powder) composition, the salt may be present in the composition in an amount of about 0 wt % to about 2 wt %, for example, in a positive amount (i.e., greater than 0 wt %) to about 2 wt % based on the total weight of the composition. In some embodiments, for example, the salt may be present in the composition in an amount of about 0 wt % to about 0.5 wt %, or in a positive amount (i.e., greater than 0 wt %) to about 0.5 wt % based on the total weight of the compositions. In some embodiments, the salt may be present in the composition in an amount of about 0.05 wt % to about 0.3 wt %, or 0.1 wt % to about 0.3 wt % based on the total weight of the composition. For example, in some embodiments, the salt may be present in the composition in an amount of about 0.1 wt %, 0.15 wt %, 0.2 wt %, 0.25 wt %, or 0.3 wt % based on the total weight of the composition.

In some embodiments, the egg substitute composition includes nutritional yeast as a flavor additive. In some embodiments, the nutritional yeast is included in addition to the salt, but in other embodiments, the nutritional yeast may be included in place of the salt (and vice versa). The nutritional yeast may be present in the composition in any suitable amount depending on the desired flavor. For example, in embodiments in which the substantially egg-less (or in some embodiments, the completely egg-less) composition is a particulate powder, the nutritional yeast may be present in the solid particulate powder in an amount of about 0 wt % to about 5 wt %, or in a positive amount (i.e., greater than 0 wt %) to about 5 wt % based on the dry weight of the particulate composition. In some embodiments, for example, the nutritional yeast may be present in the solid particulate powder in an amount of about 0 wt % to about 4 wt %, or in a positive amount (i.e., greater than 0 wt %) to about 4 wt % based on the dry weight of the particulate composition. In some embodiments, the nutritional yeast may be present in the solid particulate powder in an amount of about 1.5 wt % to about 5 wt %, or 2 wt % to about 4.5 wt % based on the dry weight of the composition. In some embodiments, for example, the nutritional yeast may be present in the solid particulate powder in an amount of about 1.25 wt %, 1.5 wt %, 1.75 wt %, 2.25 wt %, 2.5 wt %, 2.75 wt %, 3 wt %, 3.25 wt %, 3.5 wt %, 3.75 wt %, 4 wt %, 4.25 wt % or 4.5 wt % based on the dry weight of the composition.

In embodiments in which the substantially egg-less (or in some embodiments, the completely egg-less) composition is a fluid, liquid or gelatinous (i.e., rehydrated powder) composition, the nutritional yeast may be present in the composition in an amount of about 0 wt % to about 2 wt %, for example, in a positive amount (i.e., greater than 0 wt %) to about 2 wt % based on the total weight of the composition. In some embodiments, for example, the nutritional yeast may be present in the composition in an amount of about 0 wt % to about 0.5 wt %, or in a positive amount (i.e., greater than 0 wt %) to about 0.5 wt % based on the total weight of the compositions. In some embodiments, the nutritional yeast may be present in the composition in an amount of about 0.1 wt % to about 1 wt %, or 0.2 wt % to about 1 wt % based on the total weight of the composition. For example, in some embodiments, the nutritional yeast may be present in the composition in an amount of about 0.1 wt %, 0.2 wt %, 0.3 wt %, 0.4 wt %, 0.5 wt % or 0.6 wt % based on the total weight of the composition.

The substantially egg-less (or in some embodiments, the completely egg-less) composition may further include additional additives for providing other properties. For example, in some embodiments, the substantially egg-less (or in some embodiments, the completely egg-less) composition may include a viscosity (or bulk) adjusting agent. Any suitable material for adjusting the viscosity or bulk of the composition may be used, non-limiting examples of which include cellulose and cellulose gum (a.k.a. carboxymethylcellulose). Both cellulose gum (or carboxymethylcellulose) and cellulose can be used to adjust the viscosity of the composition, and cellulose can also act as a fiber supplement, bulking agent, and emulsifier. Additionally, cellulose binds free water (in embodiments in which the composition is activated with the liquid activator), thereby suspending the components of the composition, and preventing water from leaching out of the composition, or at least reducing the amount of water that leaches out.

The viscosity (or bulking) additive (e.g., cellulose and/or cellulose gum) may be present in the composition in any suitable amount. For example, in embodiments in which the substantially egg-less (or in some embodiments, the completely egg-less) composition is a particulate powder, the viscosity additive(s) may be present (collectively) in the solid particulate powder in an amount of about 0 wt % to about 30 wt %, or in a positive amount (i.e., greater than 0 wt %) to about 30 wt % based on the dry weight of the particulate composition. In some embodiments, for example, the viscosity additive(s) may be present (collectively) in the solid particulate powder in an amount of about 0 wt % to about 20 wt %, or in a positive amount (i.e., greater than 0 wt %) to about 20 wt % based on the dry weight of the particulate composition. In some embodiments, the viscosity additive(s) may be present (collectively) in the solid particulate composition in an amount of about 5 wt % to about 15 wt %, or 7 wt % to about 14 wt % based on the dry weight of the composition. In some embodiments, for example, the viscosity additive(s) may be present (collectively) in the solid particulate powder in an amount of about 8 wt % to about 17 wt %, for example, about 9 wt %, 10 wt %, 11 wt %, 12 wt %, 13 wt %, 14 wt % or 15 wt % based on the dry weight of the composition.

In embodiments in which the substantially egg-less (or in some embodiments, the completely egg-less) composition is a fluid, liquid or gelatinous (i.e., rehydrated powder) composition, the viscosity additive(s) may be present (collectively) in the composition in an amount of about 0 wt % to about 5 wt %, for example, in a positive amount (i.e., greater than 0 wt %) to about 5 wt % based on the total weight of the composition. In some embodiments, for example, the viscosity additive(s) may be present (collectively) in the composition in an amount of about 0 wt % to about 3 wt %, or in a positive amount (i.e., greater than 0 wt %) to about 3 wt % based on the total weight of the compositions. In some embodiments, the viscosity additive(s) may be present (collectively) in the composition in an amount of about 0.5 wt % to about 3 wt %, or 0.7 wt % to about 2.5 wt % based on the total weight of the composition. For example, in some embodiments, the viscosity additive(s) may be present (collectively) in the composition in an amount of about 0.5 wt %, 1 wt %, 1.5 wt %, 2 wt % or 2.5 wt % based on the total weight of the composition.

In some embodiments, the viscosity additive in the egg substitute composition includes cellulose. The cellulose may be present in the composition in any suitable amount depending on the desired bulk and/or viscosity. For example, in embodiments in which the substantially egg-less (or in some embodiments, the completely egg-less) composition is a particulate powder, the cellulose may be present in the solid particulate powder in an amount of about 0 wt % to about 30 wt %, or in a positive amount (i.e., greater than 0 wt %) to about 30 wt % based on the dry weight of the particulate composition. In some embodiments, for example, the cellulose may be present in the solid particulate powder in an amount of about 0 wt % to about 20 wt %, or in a positive amount (i.e., greater than 0 wt %) to about 20 wt % based on the dry weight of the particulate composition. In some embodiments, the cellulose may be present in the solid particulate composition in an amount of about 5 wt % to about 15 wt %, or 7 wt % to about 14 wt % based on the dry weight of the composition. In some embodiments, for example, the cellulose may be present in the solid particulate powder in an amount of about 8 wt % to about 17 wt %, for example, about 9 wt %, 10 wt %, 11 wt %, 12 wt %, 13 wt %, 14 wt % or 15 wt % based on the dry weight of the composition.

In embodiments in which the substantially egg-less (or in some embodiments, the completely egg-less) composition is a fluid, liquid or gelatinous (i.e., rehydrated powder) composition, the cellulose may be present in the composition in an amount of about 0 wt % to about 5 wt %, for example, in a positive amount (i.e., greater than 0 wt %) to about 5 wt % based on the total weight of the composition. In some embodiments, for example, the cellulose may be present in the composition in an amount of about 0 wt % to about 3 wt %, or in a positive amount (i.e., greater than 0 wt %) to about 3 wt % based on the total weight of the composition. In some embodiments, the cellulose may be present in the composition in an amount of about 0.5 wt % to about 3 wt %, or 0.7 wt % to about 2.5 wt % based on the total weight of the composition. For example, in some embodiments, the cellulose may be present in the composition in an amount of about 0.5 wt %, 1 wt %, 1.5 wt %, 2 wt % or 2.5 wt % based on the total weight of the composition.

In some embodiments, the viscosity additive in the egg substitute composition includes cellulose gum. In some embodiments, the cellulose gum is included in addition to the cellulose, but in other embodiments, the cellulose gum may be included in place of the cellulose (and vice versa). The cellulose gum may be present in the composition in any suitable amount depending on the desired viscosity or thickness. For example, in embodiments in which the substantially egg-less (or in some embodiments, the completely egg-less) composition is a particulate powder, the cellulose gum may be present in the solid particulate powder in an amount of about 0 wt % to about 5 wt %, or in a positive amount (i.e., greater than 0 wt %) to about 5 wt % based on the dry weight of the particulate composition. In some embodiments, for example, the cellulose gum may be present in the solid particulate powder in an amount of about 0 wt % to about 4 wt %, or in a positive amount (i.e., greater than 0 wt %) to about 4 wt % based on the dry weight of the particulate composition. In some embodiments, the cellulose gum may be present in the solid particulate powder in an amount of about 1.5 wt % to about 5 wt %, or 2 wt % to about 4.5 wt % based on the dry weight of the composition. In some embodiments, for example, the cellulose gum may be present in the solid particulate powder in an amount of about 1.25 wt %, 1.5 wt %, 1.75 wt %, 2.25 wt %, 2.5 wt %, 2.75 wt %, 3 wt %, 3.25 wt %, 3.5 wt %, 3.75 wt %, 4 wt %, 4.25 wt % or 4.5 wt % based on the dry weight of the composition.

In embodiments in which the substantially egg-less (or in some embodiments, the completely egg-less) composition is a fluid, liquid or gelatinous composition, the cellulose gum may be present in the composition in an amount of about 0 wt % to about 1 wt %, for example, in a positive amount (i.e., greater than 0 wt %) to about 1 wt % based on the total weight of the composition. In some embodiments, for example, the cellulose gum may be present in the composition in an amount of about 0 wt % to about 0.5 wt %, or in a positive amount (i.e., greater than 0 wt %) to about 0.5 wt % based on the total weight of the composition. In some embodiments, the cellulose gum may be present in the composition in an amount of about 0.1 wt % to about 1 wt %, or 0.2 wt % to about 1 wt % based on the total weight of the composition. For example, in some embodiments, the cellulose gum may be present in the composition in an amount of about 0.1 wt %, 0.2 wt %, 0.3 wt %, 0.4 wt %, 0.5 wt % or 0.6 wt % based on the total weight of the composition.

In some embodiments, the substantially egg-less (or in some embodiments, the completely egg-less) composition may be made vegetarian, vegan, gluten-free, soy-free, allergen-free, and/or cholesterol-free by the appropriate selection of the protein source, starch source, hydrocolloids, liquid activator, and additives. Additionally, in some embodiments, the substantially egg-less (or in some embodiments, the completely egg-less) composition may be made entirely with non-GMO (non-genetically modified) products or components.

The substantially egg-less (or in some embodiments, the completely egg-less) composition according to embodiments of the present invention can be used in various different applications. For example, the substantially egg-less (or in some embodiments, the completely egg-less) composition can be used as a whole egg or partial egg replacement (i.e., to replace the white or yolk portions of a natural egg) in various food products and recipes, including but not limited to emulsions (e.g., mayonnaise, dressings, sauces, etc.), egg dishes (e.g., scrambled eggs, omelets, quiches, frittatas, etc.), baked goods (e.g., breads, brownies, donuts, muffins, cakes, cookies, soufflés, etc.), custards and ice creams, pastas, batters and battered products (e.g., French toast, donuts, pancakes, waffles, crepes, batters for fried foods, etc.). Some examples of how the substantially egg-less (or in some embodiments, the completely egg-less) composition according to embodiments of the present invention can be used in some of these applications (e.g., yellow cake, muffins, scrambled eggs and omelets, cheesecake, custard, quiche, frittata, French toast, and onion rings) are provided in the Examples below.

Additionally, the substantially egg-less (or in some embodiments, the completely egg-less) composition can be incorporated into a baking mix for various baked goods, including, but not limited to, baking mixes for preparing breads, brownies, donuts, muffins, cakes, cookies, scones, various batters (including but not limited to waffle batters, pancake batters, breading batters (e.g., batters for breading foods for frying or baking). As used herein, the term "baking mix" is used in its art-recognized sense to refer to pre-packaged mixtures of ingredients needed to make the specified food product. Typically, a baking mix will include a package of dry ingredients and instructions to mix the dry ingredients with specific amounts of "wet" ingredients (e.g., eggs, water, milk and/or oil), and then bake the mixture to obtain the food product specified by the baking mix. According to embodiments of the present invention, a baking mix includes the egg substitute composition in particulate powder form as described herein as part of the dry ingredients. As such, baking mixes according to embodiments of the present invention would not require the addition of eggs to the dry ingredients by the consumer, thereby reducing the number of wet ingredients that need to be added in order to complete baking the product specified by the baking mix.

EXAMPLES AND COMPARATIVE EXAMPLES

To confirm the ability of the egg substitute compositions to perform comparably to real eggs in various common cooking and baking applications, the egg substitute compositions according to embodiments of the present invention were used to make a variety of food items that traditionally call for real eggs. In particular, as described in the below Examples and Comparative Examples, "scrambled eggs," "omelets," yellow cakes, muffins, cheesecakes, custards, quiches, frittatas, French toast, and onion rings were made using the egg substitute compositions according to embodiments of the present invention, and compared to the same food items made using real eggs. The Examples and Comparative Examples presented here, however, are provided for illustrative purposes only, and do not limit the scope of embodiments of the present invention.

Example A

"Scrambled Eggs" with Egg Substitute Composition

A dry composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. This dry composition was then hydrated with water (at a temperature of 50° F. or lower) to yield a composition having 85-95 wt % water, 2.4-3 wt % algal flour, 1-2 wt % algal protein, 0.4-0.8 wt % carrageenan, 1.4-1.8 wt % methylcellulose, 0.5-1 wt % gellan gum, 0.25-0.75 wt % calcium lactate, and 1-2 wt % cellulose. The hydrated composition was then cooked in a skillet over heat to yield a cooked product resembling "scrambled eggs." The cooked "scrambled eggs" are depicted in FIG. 1. As can be seen in FIG. 1, the "scrambled eggs" made using the example egg substitute composition according to Example A have a texture, look, and spring similar to scrambled eggs made using real eggs.

Example B

"Omelet" with an Example Egg Substitute Composition

Figure 2:
FIG. 2 is a photograph of the "omelet" of Example B, prepared from an egg substitute composition according to embodiments of the present invention.

A dry composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. This dry composition was then hydrated with water (at a temperature of 50° F. or lower) to yield a composition having 85-95 wt % water, 2.4-3 wt % algal flour, 1-2 wt % algal protein, 0.4-0.8 wt % carrageenan, 1.4-1.8 wt % methylcellulose, 0.5-1 wt % gellan gum, 0.25-0.75 wt % calcium lactate, and 1-2 wt % cellulose. The hydrated composition was then cooked in a skillet over heat to yield a cooked product resembling an "omelet." The cooked "omelet" is depicted in FIG. 2. As can be seen in FIG. 1, the "omelet" made using the example egg substitute composition according to Example A has a texture, look, and spring similar to omelets made using real eggs.

Example 1

Yellow Cake with an Example Egg Substitute Composition

Figure 3A:
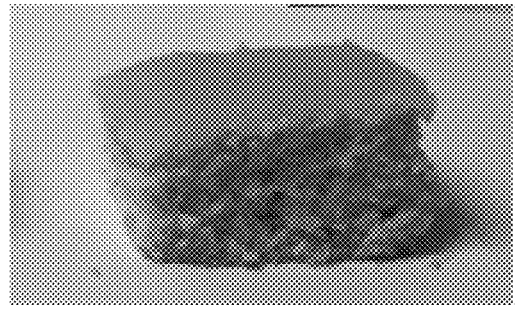
FIG. 3A is a photograph of the piece of yellow cake of Example 1, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a yellow cake, 7.75 g of this dry composition, 200 g of granulated sugar, 187.5 g of all-purpose flour, 122 g of whole milk, 113.5 g of salted butter, 92.25 g of water (at a temperature of 50° F. or lower), 8.4 g of vanilla extract, and 6.9 g of baking powder were mixed to form a batter. The batter was then baked to yield a yellow cake. The baked yellow cake is depicted in FIG. 3A.

Comparative Example 1A

Yellow Cake with Real Eggs

Figure 3B:
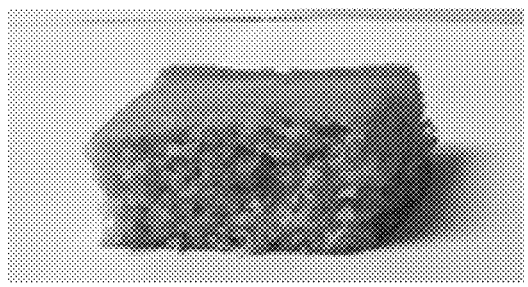
FIG. 3B is a photograph of the comparative piece of yellow cake of Comparative Example 1A, made using real eggs.

A yellow cake was prepared as in Example 1, except that the water and the dry egg substitute composition were omitted, and 100 g of whole (real) eggs were used instead. The resulting yellow cake is depicted in FIG. 3B.

Comparative Example 1B

Yellow Cake with No Real Eggs and No Egg Substitute

Figure 3C:
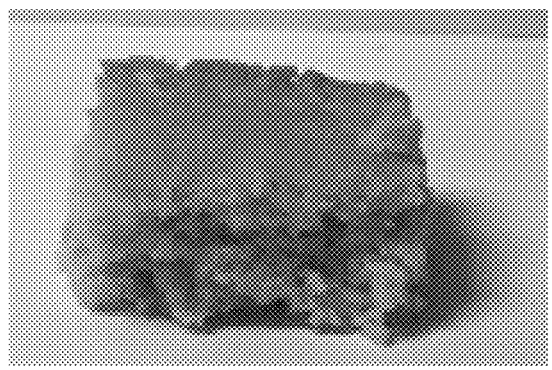
FIG. 3C is a photograph of the comparative piece of yellow cake of Comparative Example 1B, made using no eggs and no egg substitute composition.

A yellow cake was prepared as in Example 1, except that the dry egg substitute composition was omitted, and the amount of water was increased to 100 g. The resulting yellow cake is depicted in FIG. 3C.

Figure 3D:
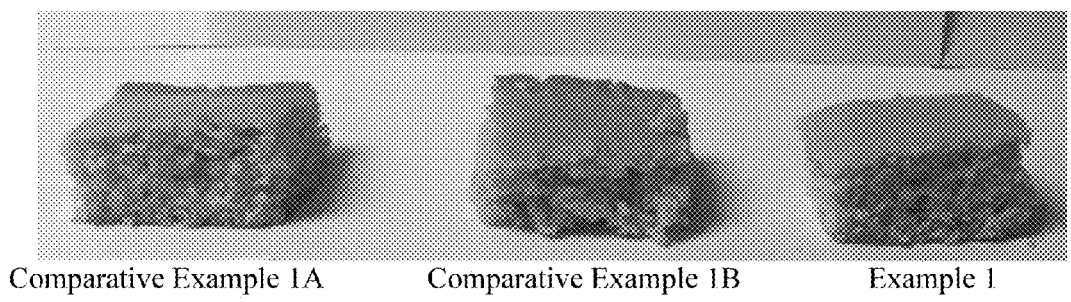
FIG. 3D is a photograph depicting the pieces of yellow cake shown in FIGS. 3B, 3C and 3A side-by-side.

FIG. 3D is a photograph of all three pieces of yellow cake from Example 1, Comparative Example 1A, and Comparative Example 1B depicted side-by-side for easy visual comparison. As can be seen in FIG. 3D (as well as in FIGS. 3A, 3B and 3C), the yellow cake made with the example egg substitute composition (Example 1) had a texture, crumb and lift similar to the yellow cake made with real eggs (Comparative Example 1A). Also, these figures show that the yellow cake made without eggs and without an example egg substitute composition (Comparative Example 1B) had a looser crumb, a drier texture (resulting in a crumbly texture, as can be seen from the increased number of crumbs depicted in this photograph), and less lift.

Example 2

Muffins with an Example Egg Substitute Composition

Figure 4A:
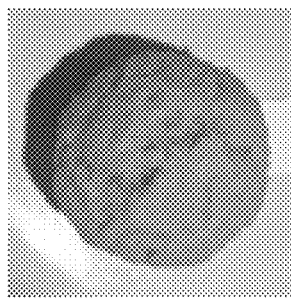
FIG. 4A is a photograph of the muffin of Example 2, made using an egg substitute composition according to embodiments of the present invention.
Figure 4B:
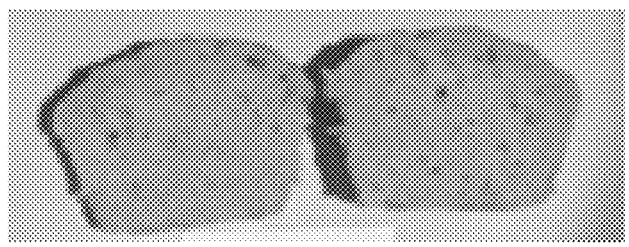
FIG. 4B is a photograph of the muffin of FIG. 4A cut in half.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a batch of muffins, 7.75 g of this dry composition, 250 g of all-purpose flour, 200 g of granulated sugar, 183 g of whole milk, 92.25 g of water (at a temperature of 50° F. or lower), 56.8 g of salted butter (melted), 54.5 g of vegetable oil, 13.8 g of baking powder, 4.2 g of vanilla extract, and 3 g of salt were mixed to form a batter. The batter was then baked to yield muffins. A representative one of the baked muffins is depicted in FIGS. 4A (whole) and 4B (cut in half to show the crumb and texture).

Comparative Example 2A

Muffins with Real Eggs

Figure 4C:
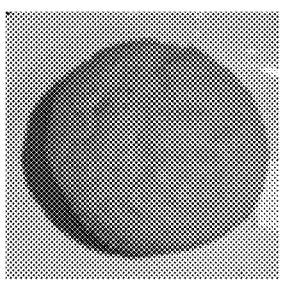
FIG. 4C is a photograph of the comparative muffin of Comparative Example 2A, made using real eggs.
Figure 4D:
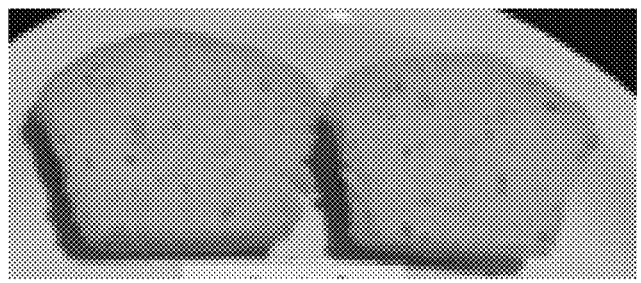
FIG. 4D is a photograph of the muffin of FIG. 4C cut in half.

A batch of muffins was prepared as in Example 2, except that the water and the dry egg substitute composition were omitted, and 100 g of whole (real) eggs were used instead. A representative one of resulting muffins is depicted in FIGS. 4C (whole) and 4D (cut in half to show the crumb and texture).

Comparative Example 2B

Muffins with No Real Eggs and No Egg Substitute

Figure 4E:
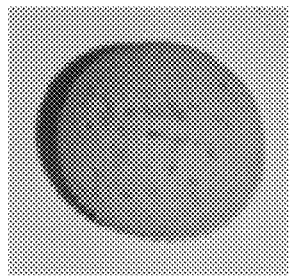
FIG. 4E is a photograph of the comparative muffin of Comparative Example 2B, made using no eggs and no egg substitute composition.
Figure 4F:
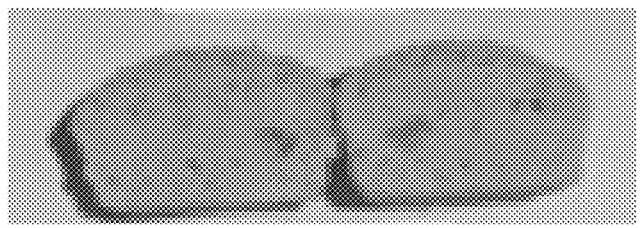
FIG. 4F is a photograph of the muffin of FIG. 4E cut in half.

A batch of muffins was prepared as in Example 2, except that the dry egg substitute composition was omitted, and the amount of water was increased to 100 g. A representative one of the resulting muffins is depicted in FIGS. 4E (whole) and 4F (cut in half to show the crumb and texture).

Figure 4G:
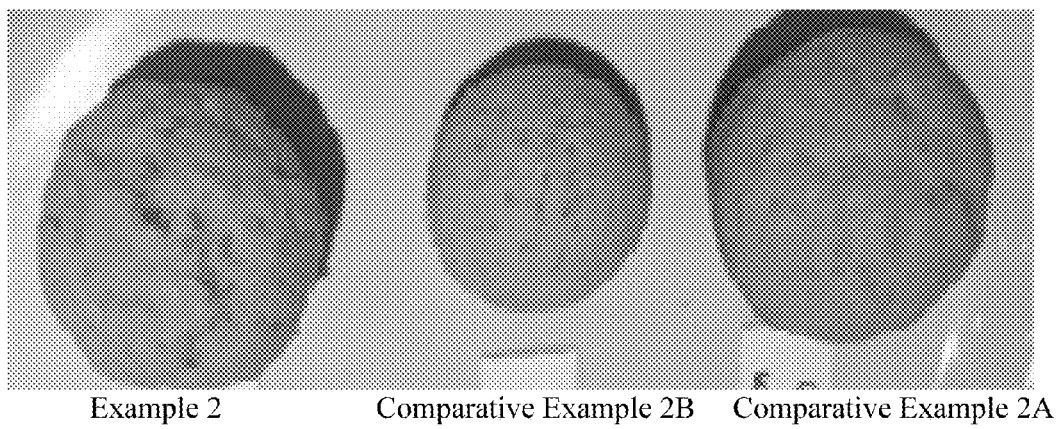
FIG. 4G is a photograph depicting the whole muffins shown in FIGS. 4A, 4E and 4C side-by-side.
Figure 4H:
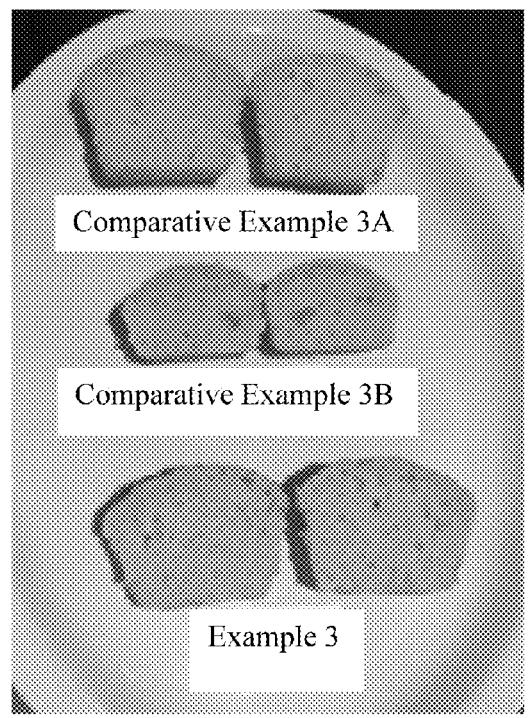
FIG. 4H is a photograph depicting the cut-in-half muffins shown in FIGS. 4D, 4F and 4B side-by-side.

FIG. 4G is a photograph of all three whole muffins from Example 2, Comparative Example 2B, and Comparative Example 2A depicted side-by-side for easy visual comparison. Additionally, FIG. 4H is a photograph of all three cut-in-half muffins depicted side-by-side for easy visual comparison. As can be seen in FIGS. 4G and 4H (as well as in FIGS. 4A through 4F), the muffins made with the example egg substitute composition (Example 2) had a texture, crumb and lift similar to the muffins made with real eggs (Comparative Example 2A). Also, these figures show that the muffins made without eggs and without an example egg substitute (Comparative Example 2B) composition had very little lift, and much denser crumb and texture.

Example 3

Cheesecake with an Example Egg Substitute Composition

Figure 5A:
FIG. 5A is a photograph of the cheesecake of Example 3, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a cheesecake, 15.8 g of this dry composition, 24.95 g of water (at a temperature of 50° F. or lower), 908 g of cream cheese, 250 g of sugar, 59.25 g of heavy cream, 57.5 g of sour cream, 8.4 g of vanilla extract and 4 g of minced lemon zest were mixed to form a batter, and 26.9 g of graham cracker crumbs and 14.2 g of unsalted butter (melted) were mixed to form a crust composition. The crust composition was formed in the bottom of a spring form pan, and the batter was poured into the pan on the formed crust composition. The batter and crust were then baked to yield a cheesecake. The resulting cheesecake is depicted in FIG. 5A.

Comparative Example 3

Cheesecake with Real Eggs

A cheesecake was prepared as in Example 3, except that the water and the dry egg substitute composition were omitted, and 200 g of whole (real) eggs were used instead. The resulting cheesecake is depicted in FIG. 5B.

Figure 5B:
FIG. 5B is a photograph of the comparative cheesecake of Comparative Example 3, made using real eggs.

As can be seen in FIGS. 5A and 5B, the cheesecake made with the example egg substitute composition (Example 3) had a texture, crumb and lift similar to the cheesecake made with real eggs (Comparative Example 3).

Example 4

Custard with an Example Egg Substitute Composition

Figure 6A:
FIG. 6A is a photograph of the custard of Example 4, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a custard, 8.1 g of this dry composition, 91.9 g of water (at a temperature of 50° F. or lower), 488 g of whole milk, 100 g of sugar, 1.05 g of vanilla extract, 0.75 g of salt, and 0.32 g of cinnamon were mixed to form a custard base. The custard base was then baked to yield a custard. The resulting custard is depicted in FIG. 6A.

Comparative Example 4

Custard with Real Eggs

A custard was prepared as in Example 4, except that the water and the dry egg substitute composition were omitted, and 100 g of whole (real) eggs were used instead. The resulting custard is depicted in FIG. 6B.

Figure 6B:
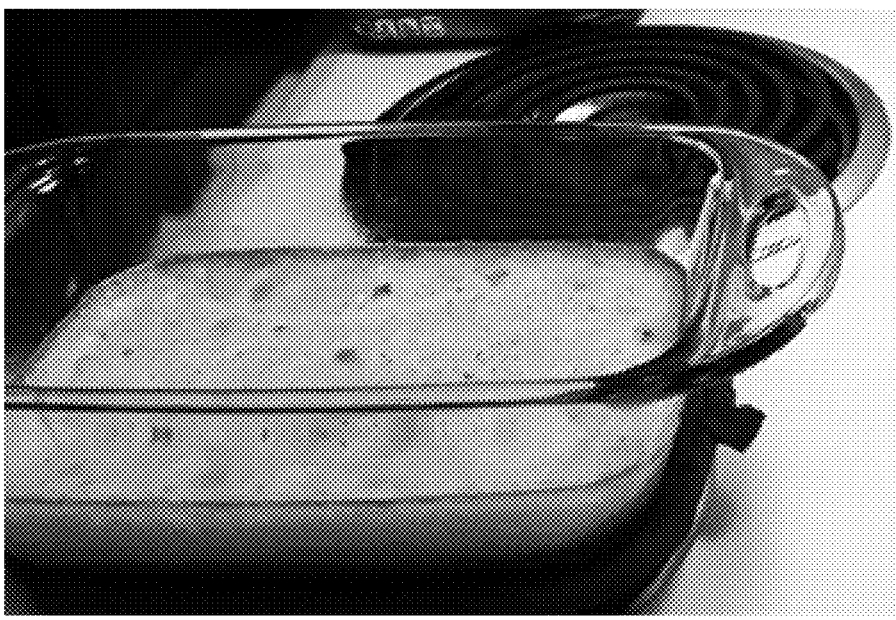
FIG. 6B is a photograph of the comparative custard of Comparative Example 4, made using read eggs.

As can be seen in FIGS. 6A and 6B, the custard made with the example egg substitute composition (Example 4) had a spring, texture, lift and browning profile similar to the custard made with real eggs (Comparative Example 4).

Example 5

Quiche with an Example Egg Substitute Composition

Figure 7A:
FIG. 7A is a photograph of the broccoli and cheddar cheese quiche of Example 5, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a broccoli and vegan cheddar cheese quiche, 16.2 g of this dry composition, 183.8 g of water (at a temperature of 50° F. or lower), 212.63 g of frozen chopped broccoli (thawed and drained), 169.5 g of vegan cheddar cheese (shredded), and 121 g of half-and-half were mixed to form a quiche base. A pre-formed (raw) pie crust (198 g) was placed at the bottom of a pie plate, and the quiche based was poured into the crust in the pie plate. The quiche base and crust were then baked to yield a broccoli and cheddar cheese quiche. The resulting quiche is depicted in FIG. 7A.

Comparative Example 5

Quiche with Real Eggs

A quiche was prepared as in Example 5, except that the water and the dry egg substitute composition were omitted, and 200 g of whole (real) eggs were used instead. The resulting quiche is depicted in FIG. 7B.

Figure 7B:
FIG. 7B is a photograph of the comparative broccoli and cheddar cheese quiche of Comparative Example 5, made using real eggs.

As can be seen in FIGS. 7A and 7B, the quiche made with the example egg substitute composition (Example 5) had a spring, texture and lift similar to the quiche made with real eggs (Comparative Example 5). In fact, in comparing the quiches depicted in FIGS. 7A and 7B, the quiches appear indistinguishable in structure.

Example 6

Frittata with an Example Egg Substitute Composition

Figure 8A:
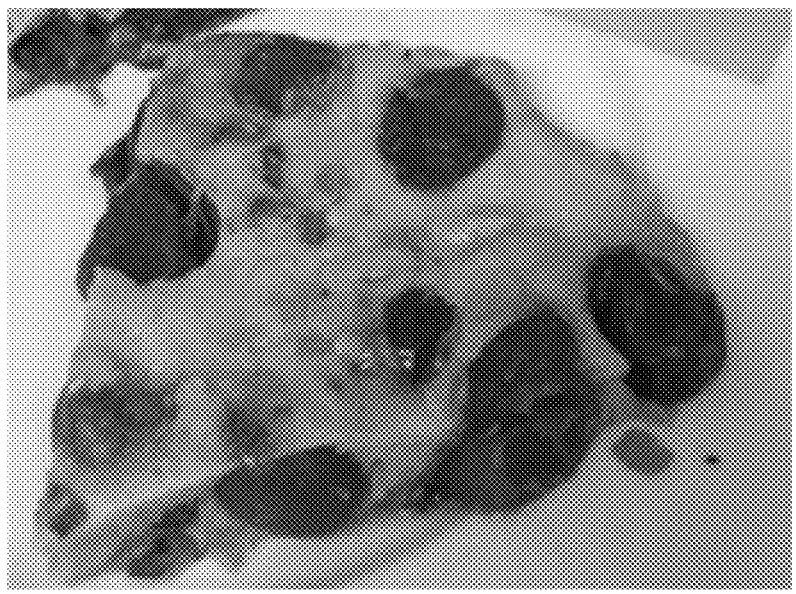
FIG. 8A is a photograph of the tomato, scallion and cheddar cheese frittata of Example 6, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a tomato, scallion and vegan cheddar cheese frittata, 32.4 g of this dry composition, 367.6 g of water (at a temperature of 50° F. or lower), 316 g of grape tomatoes, 100 of sliced scallions, 84.75 g of vegan cheddar cheese (shredded), 1.5 g of salt and 0.58 g of black pepper were mixed to form a frittata base. Then, 14 g of extra virgin olive was heated in a skillet, and the frittata based was added to the heated oil in the skillet, and cooked to yield a frittata. The resulting frittata is depicted in FIG. 8A.

Comparative Example 6

Frittata with Real Eggs

A quiche was prepared as in Example 6, except that the water and the dry egg substitute composition were omitted, and 400 g of whole (real) eggs were used instead. The resulting quiche is depicted in FIG. 8B.

Figure 8B:
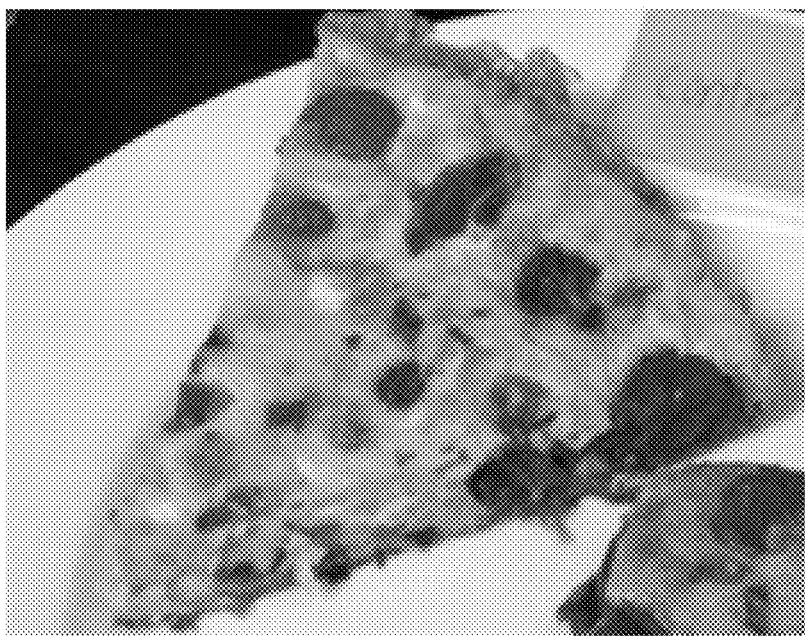
FIG. 8B is a photograph of the comparative tomato, scallion and cheddar cheese frittata of Comparative Example 6, made using real eggs.

As can be seen in FIGS. 8A and 8B, the frittata made with the example egg substitute composition (Example 6) had a spring, texture and lift similar to the frittata made with real eggs (Comparative Example 6).

Example 7

French Toast with an Example Egg Substitute Composition

Figure 9A:
FIG. 9A is a photograph of the piece of French toast of Example 7, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a slice of French toast, 7.75 g of this dry composition, 92.25 g of water (at a temperature of 50° F. or lower), 80.5 g of unsweetened vanilla almond milk, and 1.3 g of cinnamon were mixed to form a dipping batter. Then, whole wheat bread (58 g) was coated with the dipping batter. The battered whole wheat bread was then cooked in skillet over heat, yielding a slice of French toast. The resulting slice of French toast is depicted in FIG. 9A.

Comparative Example 7

French Toast with Real Eggs

A slice of French toast was prepared as in Example 7, except that the water and the dry egg substitute composition were omitted, and 100 g of whole (real) eggs were used instead. The resulting slice of French toast is depicted in FIG. 9B.

Figure 9B:
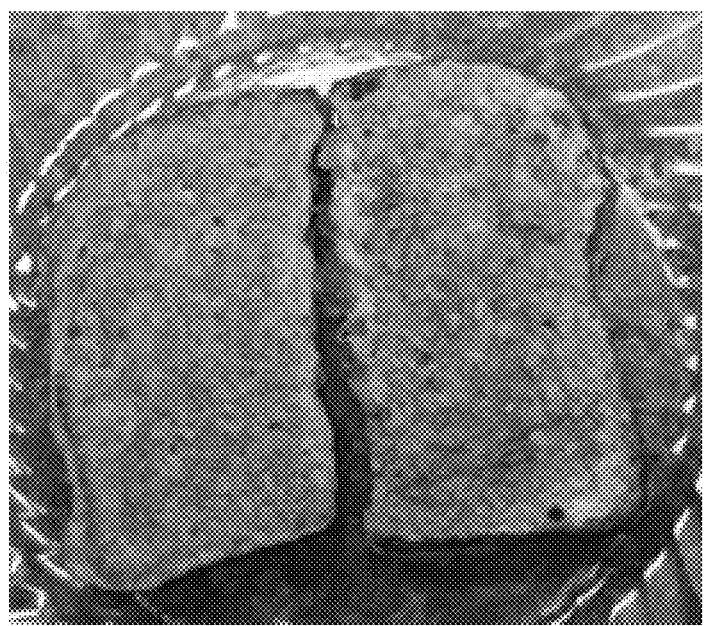
FIG. 9B is a photograph of the comparative piece of French toast of Comparative Example 7, made using real eggs.

As can be seen in FIGS. 9A and 9B, the French toast made with the example egg substitute composition (Example 7) had a coating thickness, coating texture, and browning profile similar to the French toast made with real eggs (Comparative Example 7).

Example 8

Onion Rings with an Example Egg Substitute Composition

Figure 10A:
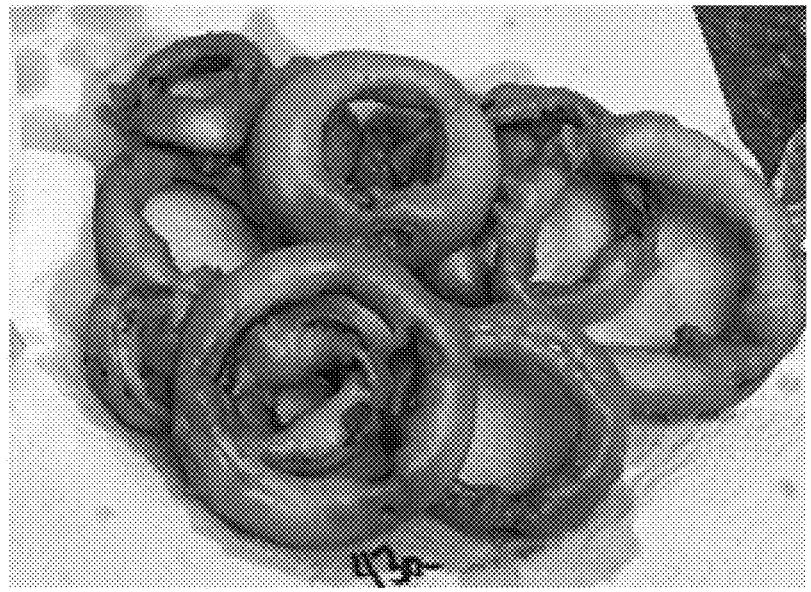
FIG. 10A is a photograph of the batch of onion rings of Example 8, made using an egg substitute composition according to embodiments of the present invention.

A dry egg substitute composition was prepared including 26-34 wt % algal flour, 15-20 wt % algal protein, 4-7 wt % carrageenan, 14-18 wt % methylcellulose, 6-10 wt % gellan gum, 3-6 wt % calcium lactate, and 10-13 wt % cellulose. To prepare a batch of battered onion rings, 4.1 g of this dry composition, 45.9 g of water (at a temperature of 50° F. or lower), 122 g of milk, 62.5 g of flour, 4.5 g of salt, and 2.3 g of baking powder were mixed to form a dipping batter. Then, sliced white onions (75 g) were coated with the dipping batter. The battered onions were then fried in heated vegetable oil, yielding a batch of onion rings. The resulting onion rings are depicted in FIG. 10A.

Comparative Example 8

Onion Rings with Real Eggs

A batch of onion rings was prepared as in Example 8, except that the water and the dry egg substitute composition were omitted, and 50 g of whole (real) eggs were used instead. The resulting batch of onion rings is depicted in FIG. 10B.

Figure 10B:
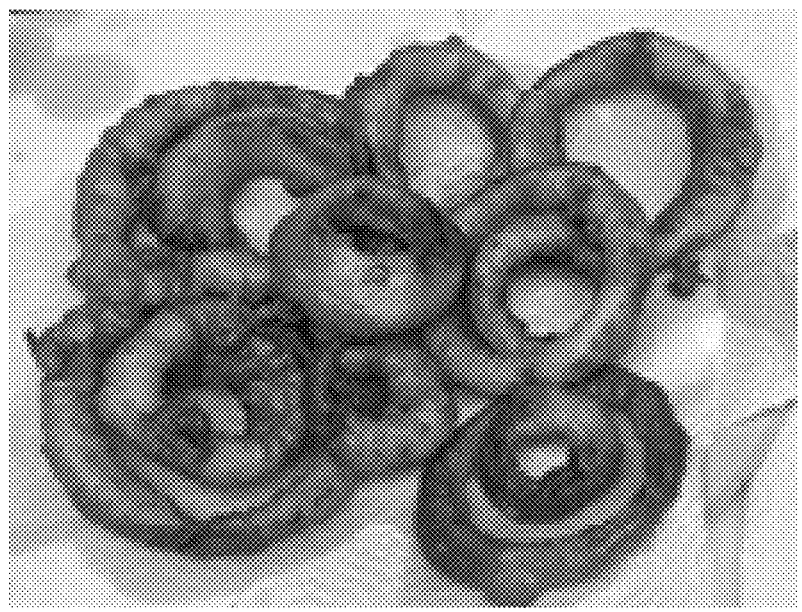
FIG. 10B is a photograph of the comparative batch of onion rings of Comparative Example 8, made using real eggs.

As can be seen in FIGS. 10A and 10B, the onion rings made with the example egg substitute composition (Example 8) had a coating thickness, coating texture, and browning profile similar to the onion rings made with real eggs (Comparative Example 8). In fact, other than a slightly shinier (or oilier) exterior appearance, the onion rings in FIGS. 10A and 10B appear indistinguishable.

As demonstrated by these Examples and Comparative Examples, the egg substitute compositions according to embodiments of the present invention can be used as a suitable egg replacement in a wide variety of different cooking and baking applications that traditionally call for the inclusion of real eggs. Indeed, as shown in the above comparisons of Examples and corresponding Comparative Examples, replacing real eggs in some recipes can result in a virtually indistinguishable difference between the egg substitute food item and the real egg food item.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "a" protein source, "a" starch source, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as including a mixture of hydrocolloids including carrageenan, methylcellulose and gellan gum, a mixture of hydrocolloids consisting essentially of or consisting of carrageenan, methylcellulose and gellan gum is also within the scope of this disclosure. Accordingly, the mixture of hydrocolloids may consist essentially of the carrageenan, methylcellulose and gellan gum. In this context, "consisting essentially of" means that any additional components in the mixture of hydrocolloids will not materially interact with the crosslinking agent to form the described 3D network structure.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure describes "a" starch source or "a" protein source, a mixture of such starch sources or protein sources can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:
1. A dry composition comprising:
   a substantially egg-less dry mixture comprising:
      an algal component;
      a lipid source; and
      a hydrocolloid system comprising:
         a mixture of hydrocolloids comprising a lower-temperature gelling hydrocolloid gum and a higher-temperature gelling hydrocolloid gum; and
         a crosslinking agent,
         the lower-temperature gelling hydrocolloid gum, the higher-temperature gelling hydrocolloid gum, and the crosslinking agent being selected to enable crosslinking of the mixture of hydrocolloids by the crosslinking agent upon introduction of a liquid and application of heat to form a hydrocolloid network that is irreversible after the application of heat and remains stable independent of temperature, wherein the higher-temperature gelling hydrocolloid comprises methylcellulose and/or hydroxypropyl methylcellulose, and the lower-temperature gelling hydrocolloid comprises carrageenan, locust bean gum, an alginate and/or gellan gum.

2. The composition according to claim 1, further comprising a protein source.

3. The composition according to claim 2, wherein the protein source comprises a plant-based protein source.

4. The composition according to claim 2, wherein the protein source comprises a protein derived from a vegetable, a legume, a seed, a grain, a tuber, a root, a fruit, hemp, a nut, an algae, and/or a seaweed.

5. The composition according to claim 2, wherein the protein source comprises the algal component, the algal component comprising a protein derived from an algae.

6. The composition according to claim 2, wherein the protein source comprises the algal component, the algal component comprising a protein derived from a microalgae.

7. The composition according to claim 2, wherein the protein source comprises the algal component, the algal component comprising a microalgal protein.

8. The composition according to claim 2, wherein the protein source and the lipid source are present in a weight ratio of greater than 0: less than 100 to less than 100: greater than 0 based on 100 wt % of the combination of the protein source and the lipid source.

9. The composition according to claim 2, wherein the protein source is present in the dry mixture in an amount of greater than 0 wt % to about 50 wt % based on a dry weight of the dry mixture.

10. A composition, comprising a liquid composition resulting from hydration of the composition according to claim 1 with a liquid activator.

11. A composition, comprising a liquid composition resulting from hydration of the composition according to claim 2 with a liquid activator.

12. The composition according to claim 1, wherein the lipid source comprises a plant-based lipid source.

13. The composition according to claim 1, wherein the lipid source comprises a lipid derived from a vegetable, a legume, a sprouted bean or legume, a seed, a grain, a sprouted grain, a tuber, a root, a fruit, hemp, a nut, an algae, and/or a seaweed.

14. The composition according to claim 1, wherein the lipid source comprises the algal component, the algal component comprising a lipid derived from an algae.

15. The composition according to claim 1, wherein the lipid source comprises the algal component, the algal component comprising a lipid derived from a microalgae.

16. The composition according to claim 1, wherein the lipid source comprises the algal component, the algal component comprising a microalgal flour.

17. The composition according to claim 1, wherein the lipid source is present in the dry mixture in an amount of greater than 0 wt % to about 50 wt % based on a dry weight of the dry mixture.

18. The composition according to claim 10, wherein the lipid source is present in the liquid composition in an amount of greater than 0 wt % to about 20 wt % based on a total weight of the liquid composition.

19. The composition according to claim 1, wherein the higher-temperature gelling hydrocolloid is present in the mixture of hydrocolloids in an amount of about 35 wt % to about 75 wt % based on a total weight of the mixture of hydrocolloids.

20. The composition according to claim 1, wherein the lower-temperature gelling hydrocolloid is present in the mixture of hydrocolloids in an amount of about 30 wt % to about 70 wt % based on a total weight of the mixture of hydrocolloids.

21. The composition according to claim 1, wherein the gellan gum includes high acyl gellan gum.

22. The composition according to claim 1, wherein the crosslinking agent includes a salt having a monovalent or divalent metal cation, and an anion.

23. The composition according to claim 22, wherein the monovalent or divalent metal cation of the salt comprises a monovalent or divalent alkali metal ion or alkali earth metal ion.

24. The composition according to claim 23, wherein the metal cation comprises $Na^+$, $K^+$, $Mg^{2+}$ and/or $Ca^{2+}$.

25. The composition according to claim 22, wherein the anion comprises a lactate anion, a chloride anion, a propionate anion and/or a gluconate anion.

26. The composition according to claim 10, wherein the liquid activator comprises water, a milk, a brine and/or a juice.

27. The composition according to claim 10, wherein the liquid activator is present in the liquid composition in an amount of about 60 wt % to about 95 wt % based on a total weight of the liquid composition.

28. The composition according to claim 10, wherein a temperature of the liquid activator is about 50° F. or lower.

29. The composition according to claim 1, wherein the dry mixture further comprises a flavor additive and/or a viscosity modifier.

30. The composition according to claim 29, wherein the flavor additive comprises salt, a natural flavoring, an autolysed yeast and/or nutritional yeast.

31. The composition according to claim 29, wherein the viscosity modifier comprises cellulose and/or cellulose gum.

32. The composition according to claim 10, further comprising an encapsulate for encapsulating the crosslinking agent during storage.

33. The composition according to claim 10, further comprising a preservative.

34. The composition according to claim 10, wherein the liquid composition is cold pasteurized or high pressure processed (HPP).

35. The composition according to claim 1, wherein the composition is vegetarian, vegan, gluten-free, soy-free, allergen-free, and/or cholesterol-free.

36. The composition according to claim 1, wherein the composition contains substantially no genetically modified components.

37. An emulsion comprising the composition of claim 1.

38. The emulsion according to claim 37, wherein the emulsion is a mayonnaise substitute.

39. A baking mix comprising the composition according to claim 1.

40. The composition according to claim 11, wherein the protein source is present in the liquid composition in an amount of greater than 0 wt % to about 20 wt % based on a total weight of the liquid composition.

41. The composition according to claim 1, further comprising a starch source.

42. A composition, comprising a liquid composition resulting from hydration of the composition according to claim 41 with a liquid activator.

43. The composition according to claim 2, further comprising a starch source.

44. A composition, comprising a liquid composition resulting from hydration of the composition according to claim 43 with a liquid activator.

45. The composition according to claim 41, wherein the starch source comprises a plant-based starch source.

46. The composition according to claim 42, wherein the starch source comprises a plant-based starch source.

47. The composition according to claim 43, wherein the starch source comprises a plant-based starch source.

48. The composition according to claim 44, wherein the starch source comprises a plant-based starch source.

49. The composition according to claim 43, wherein a weight ratio of the protein source to the combination of the starch source and the lipid source is greater than 0: less than 100: less than 100: greater than 0 based on 100 wt % of the combination of the protein source, the starch source and the lipid source.

50. The composition according to claim 41, wherein the starch source comprises a starch derived from a vegetable, a legume, a sprouted bean or legume, a seed, a grain, a sprouted grain, a tuber, a root, a fruit, hemp, a nut, an algae, a seaweed, and/or an isolated starch.

51. The composition according to claim 41, wherein the starch source and the lipid source are present in the dry mixture in a combined amount of greater than 0 wt % to about 50 wt % based on a dry weight of the dry mixture.

52. The composition according to claim 42, wherein the starch source and the lipid source are present in the liquid composition in a combined amount of greater than 0 wt % to about 20 wt % based on a total weight of the liquid composition.

53. The composition according to claim 41, wherein the starch source comprises the algal component, the algal component comprising a starch derived from an algae.

54. The composition according to claim 41, wherein the starch source comprises the algal component, the algal component comprising a starch derived from a microalgae.

55. The composition according to claim 41, wherein the starch source comprises the algal component, the algal component comprising a microalgal flour.

56. The composition according to claim 10, wherein upon application of direct heat to the liquid composition, the liquid composition reacts to form an irreversible structure emulating a heated, scrambled natural egg.

57. The composition according to claim 1, wherein the substantially egg-less dry mixture is capable of reacting with a measured amount of liquid activator upon application of direct heat to form a temperature independent irreversible structure emulating a heated, scrambled natural egg.

* * * * *